United States Patent
Zhu et al.

(10) Patent No.: US 12,050,837 B2
(45) Date of Patent: Jul. 30, 2024

(54) SCREEN PROJECTION METHOD AND APPARATUS, ELECTRONIC DEVICE, AND COMPUTER-READABLE MEDIUM

(71) Applicant: BEIJING BYTEDANCE NETWORK TECHNOLOGY CO., LTD., Beijing (CN)

(72) Inventors: Haizhou Zhu, Beijing (CN); Chi Fang, Beijing (CN)

(73) Assignee: DOUYIN VISION CO., LTD., Beijing (CN)

(*) Notice: Subject to any disclaimer, the term of this patent is extended or adjusted under 35 U.S.C. 154(b) by 0 days.

(21) Appl. No.: 18/023,698

(22) PCT Filed: Aug. 25, 2021

(86) PCT No.: PCT/CN2021/114501
§ 371 (c)(1),
(2) Date: Feb. 27, 2023

(87) PCT Pub. No.: WO2022/042592
PCT Pub. Date: Mar. 3, 2022

(65) Prior Publication Data
US 2023/0305792 A1 Sep. 28, 2023

(30) Foreign Application Priority Data

Aug. 27, 2020 (CN) .......................... 202010880615.3
Aug. 27, 2020 (CN) .......................... 202010881479.X
Aug. 27, 2020 (CN) .......................... 202010881499.7

(51) Int. Cl.
*G06F 3/14* (2006.01)
*G06F 3/0482* (2013.01)

(52) U.S. Cl.
CPC .......... *G06F 3/1454* (2013.01); *G06F 3/0482* (2013.01)

(58) Field of Classification Search
CPC . H04N 21/4122; G06F 3/1454; G06F 3/0482; G06F 9/452
See application file for complete search history.

(56) References Cited

U.S. PATENT DOCUMENTS

| 2010/0064260 | A1 | 3/2010 | Amano |
| 2015/0373066 | A1 | 12/2015 | Miao et al. |
| 2016/0241905 | A1 | 8/2016 | Gao et al. |

FOREIGN PATENT DOCUMENTS

| CN | 101621644 A | 1/2010 |
| CN | 107493375 A | 12/2017 |

(Continued)

OTHER PUBLICATIONS

International Patent Application No. PCT/CN2021/114501; Int'l Written Opinion and Search Report; dated Nov. 25, 2021; 10 pages.

(Continued)

*Primary Examiner* — Abbas I Abdulselam
(74) *Attorney, Agent, or Firm* — BakerHostetler

(57) ABSTRACT

Provided are a screen projection method and apparatus, an electronic device, and a computer-readable medium. The method comprises: acquiring a disconnection instruction; according to the disconnection instruction, disconnecting at least one first target screen projection source from a screen projection device, and determining a second connection number, wherein the second connection number is the number of first target screen projection sources which are not disconnected; and according to the second connection number and a first window number, displaying screen projection information projected by each first target projection screen source, which is not disconnected, onto the screen projection device, wherein the first window number is the number of target windows that have been opened on the (Continued)

screen projection device. By means of the method, window resources are saved on, and the user experience is improved.

17 Claims, 11 Drawing Sheets

(56) References Cited

FOREIGN PATENT DOCUMENTS

| | | |
|---|---|---|
| CN | 107493484 A | 12/2017 |
| CN | 108124173 A | 6/2018 |
| CN | 109032485 A | 12/2018 |
| CN | 109379549 A | 2/2019 |
| CN | 109992231 A | 7/2019 |
| CN | 110221798 A | 9/2019 |
| CN | 110248226 A | 9/2019 |
| CN | 110417992 A | 11/2019 |
| CN | 111131866 A | 5/2020 |
| CN | 111381791 A | 7/2020 |
| CN | 111506282 A | 8/2020 |
| CN | 111552450 A | 8/2020 |
| CN | 111552565 A | 8/2020 |
| CN | 111580765 A | 8/2020 |
| CN | 112019896 A | 12/2020 |
| CN | 112019914 A | 12/2020 |
| WO | WO 2019/001347 A1 | 1/2019 |

OTHER PUBLICATIONS

Jialong, Deng; "With the help of screen synchronization software, build a physical booth for mobile phones"; China Information Technology Education; Mar. 2020; 14 pages (contains English Translation).

SCREEN PROJECTION METHOD AND APPARATUS, ELECTRONIC DEVICE, AND COMPUTER-READABLE MEDIUM

CROSS REFERENCE OF RELATED APPLICATION

This application is the national phase of International Patent Application No. PCT/CN2021/114501, titled "SCREEN PROJECTION METHOD AND APPARATUS, ELECTRONIC DEVICE, AND COMPUTER-READABLE MEDIUM", filed on Aug. 25, 2021, which claims priority to Chinese Patent Application 202010880615.3, titled "METHOD AND APPARATUS FOR SCREEN MIRRORING, ELECTRONIC DEVICE, AND COMPUTER-READABLE MEDIUM", filed on Aug. 27, 2020 with the China National Intellectual Property Administration, Chinese Patent Application 202010881499.7, titled "METHOD AND APPARATUS FOR SCREEN MIRRORING, ELECTRONIC DEVICE, AND COMPUTER-READABLE MEDIUM", filed on Aug. 27, 2020 with the China National Intellectual Property Administration, and Chinese Patent Application No. 202010881479.X, titled "METHOD AND APPARATUS FOR SCREEN MIRRORING, ELECTRONIC DEVICE, AND COMPUTER-READABLE MEDIUM", filed on Aug. 27, 2020 with the China National Intellectual Property Administration, all of which are incorporated herein by reference in their entireties.

FIELD

The present disclosure relates to the technical field of computers, and in particular to a method and an apparatus for screen mirroring, an electronic device, and a computer-readable medium.

BACKGROUND

Wireless screen mirroring is also called wireless co-screening, flying screen or screen sharing. That is, content displayed on a screen of a projection source is mirrored to a projection device in real time. The projection source may be a mobile phone, a tablet, a laptop, a computer and the like. The projection device may be a tablet, a laptop, a computer, a television, an all-in-one computer, a projector and the like. The content displayed on the screen of the projection device includes various media information, real-time operation images, and the like.

In the related art, a projection device is connected to a projection source. The projection device opens a window for displaying content mirrored from the projection source to the projection device. When the projection source is disconnected from the projection device, the window displays no content, that is, becomes a blank window. In the existing solutions, resources such as projection windows fail to be fully utilized, resulting in wasted resources and poor customer experience. In the existing screen mirroring technology, screen mirroring application software only simply projects the content on a screen of one device to another device, and fails to modify parameters and manage the screen mirroring. Moreover, users at some viewing angles in a large space may fail to see the mirrored content. The present disclosure aims to solve one of the above problems.

SUMMARY

This summary is provided to introduce concepts in a simplified form. These concepts will be described in detail in the detailed description that follows. This summary is neither intended to identify key or essential features of the claimed technical solutions nor to limit the scope of the claimed technical solutions.

In view of the disadvantages of the existing solutions, a method and an apparatus for screen mirroring, an electronic device, and a computer-readable medium are provided according to the present disclosure, so as to solve the problem of how to reasonably utilize window resources.

In a first aspect, a method for screen mirroring is provided according to the present disclosure. The method includes: acquiring a disconnection instruction; in response to the disconnection instruction, disconnecting at least one first target projection source from a projection device, and determining a second connection number, where the second connection number is the number of first target projection sources that are still connected to the projection device; and displaying, based on the second connection number and a first window number, projection information mirrored to the projection device from the first target projection sources that are still connected to the projection device, where the first window number is the number of target windows that are already opened on the projection device.

In a second aspect, a method for screen mirroring is provided according to the present disclosure. The method includes: acquiring a first connection instruction and a window opening instruction, where the first connection instruction is for instructing to connect a projection device to a projection source, and the window opening instruction is for instructing to open a window on the projection device; and receiving a window display instruction, and displaying, in target windows, projection information mirrored from first target projection sources to the projection device, where the target windows are included in windows indicated by the window display instruction among windows opened on the instruction of the window opening instruction, and the first target projection sources include the projection source connected to the projection device on the instruction of the first connection instruction.

In a third aspect, a method for screen mirroring is provided according to the present disclosure. The method includes: receiving projection content sent by a projection transmitter, and displaying the projection content on a projection display interface of a projection receiver, where the projection display interface is provided with a display state adjustment area; receiving a display state adjustment operation performed by a user based on the display state adjustment area; and adjusting a display state of the projection display interface based on the display state adjustment operation.

In a fourth aspect, a method for screen mirroring is provided according to the present disclosure. The method includes: receiving a multi-window display instruction, and displaying, in at least two target windows, projection information mirrored form a target projection source to a projection device, where the target window is one of at least two windows that are already opened on the projection device, and the target projection source is one of at least one projection source connected to the projection device.

In a fifth aspect, a method for screen mirroring is provided according to the present disclosure. The method includes: receiving a display switching instruction, and alternatively displaying, in a target window, projection information mirrored from at least two target projection sources to the projection device. The target window is one of at least one window that is already opened on the projection device. The target projection source is one of at least two projection sources connected to the projection device.

In a sixth aspect, an apparatus for screen mirroring is provided according to the present disclosure. The apparatus includes a first processing module, a second processing module and a third processing module. The first processing module is configured to acquire a disconnection instruction. The second processing module is configured to, in response to the disconnection instruction, disconnect least one first target projection source from a projection device, and determine a second connection number, where the second connection number is the number of first target projection sources that are still connected to the projection device. The third processing module is configured to display projection information mirrored to the projection device from the first target projection sources that are still connected to the projection device based on the second connection number and a first window number, where the first window number is the number of target windows that are already opened on the projection device.

In a seventh aspect, an apparatus for screen mirroring is provided according to the present disclosure. The apparatus includes a fourth processing module and a fifth processing module. The fourth processing module is configured to acquire a first connection instruction and a window opening instruction, where the first connection instruction is for instructing to connect a projection device to a projection source, and the window opening instruction is for instructing to open a window on the projection device. The fifth processing module is configured to receive a window display instruction, and display, in target windows, projection information mirrored from first target projection sources to the projection device, where the target windows are included in windows indicated by the window display instruction among windows opened on the instruction of the window opening instruction, and the first target projection sources include the projection source connected to the projection device on the instruction of the first connection instruction.

In an eighth aspect, an apparatus for screen mirroring is provided according to the present disclosure. The apparatus includes a projection content receiving module, an operation receiving module and a state adjustment module. The projection content receiving module is configured to receive projection content sent by a projection transmitter, and display the projection content on a projection display interface of a projection receiver, where the projection display interface is provided with a display state adjustment area. The operation receiving module is configured to receive a display state adjustment operation performed by a user based on the display state adjustment area. The state adjustment module is configured to adjust a display state of the projection display interface based on the display state adjustment operation.

In a ninth aspect, an apparatus for screen mirroring is provided according to the present disclosure. The apparatus includes a first processing module. The first processing module is configured to receive a multi-window display instruction, and display, in at least two target windows, projection information mirrored form a target projection source to a projection device, where the target window is one of at least two windows that are already opened on the projection device, and the target projection source is one of at least one projection source connected to the projection device.

In a tenth aspect, an apparatus for screen mirroring is provided according to the present disclosure. The apparatus includes a second processing module. The second processing module is configured to receive a display switching instruction, and switch, on a target window, between projection information mirrored from at least two target projection sources to the projection device. The target window is one of at least one window that is already opened on the projection device. The target projection source is one of at least two projection sources connected to the projection device.

In an eleventh aspect, an electronic device is provided according to the present disclosure. The electronic device includes: a processor, a memory, and a bus. The bus is configured to connect the processor to the memory. The memory is configured to store operation instructions. The processor is configured to invoke the operation instructions to perform the method for screen mirroring according to the first, second, third, fourth and fifth aspects of the present disclosure.

In a twelfth aspect, a computer-readable medium is provided according to the present disclosure. The computer-readable medium stores a computer program, and the computer program is for implementing the method for screen mirroring according to the first, second, third, fourth and fifth aspects of the present disclosure.

The technical solutions according to the embodiments of the present disclosure have at least the following beneficial effects.

At least one first target projection source is disconnected from a projection device. A second connection number is determined. The second connection number is the number of first target projection sources that are still connected to the projection device. Projection information mirrored from the first target projection sources that are still connected to the projection device is displayed based on the second connection number and a first window number. The first window number is the number of target windows that are already opened on the projection device. Therefore, it is ensured that the projection information mirrored from the first target projection sources that are still connected to the projection device is displayed in target windows in appropriate number, thereby saving window resources and improving user experience.

The projection display interface that displays the projection content is provided with a display state adjustment area. A display state adjustment operation performed by a user is received based on the display state adjustment area. A display state of the projection display interface is adjusted based on the display state adjustment operation. In this way, the user can adjust the display state of the projection display interface directly at a projection receiver or through a remote-control device, which is convenient to use.

A multi-window display instruction is received. Projection information mirrored form a target projection source to a projection device is displayed on at least two target windows. The target window is one of at least two windows that are already opened on the projection device. The target projection source is one of at least one projection source connected to the projection device.

Additional aspects and advantages according to the present disclosure will be set forth, in part, from the following description, and will become apparent from the following description, or may be learned by practice according to the present disclosure.

BRIEF DESCRIPTION OF THE DRAWINGS

The above and other features, advantages and aspects according to embodiments of the present disclosure will become apparent in conjunction with the drawings and with reference to the following detailed description. Throughout the drawings, the same or similar reference numbers refer to the same or similar elements. It should be understood that the drawings are illustrative and that the originals and elements are unnecessarily drawn to scale.

In order to more clearly illustrate the technical solutions according to the embodiments of the present disclosure, the drawings to be used in the description of the embodiments according to the present disclosure are briefly introduced below.

DETAILED DESCRIPTION OF EMBODIMENTS

Figure 1:
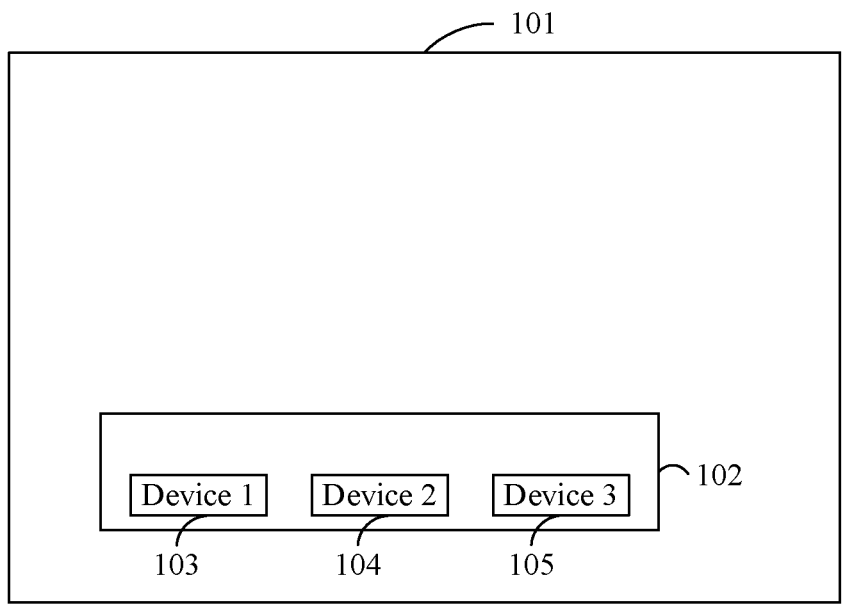
FIG. 1 is a schematic diagram illustrating screen mirroring according to an embodiment of the present disclosure.

Embodiments according to the present disclosure will be described in more detail below with reference to the drawings. Although some embodiments according to the present disclosure are shown in the drawings, it should be understood that the present disclosure may be implemented in various forms and should not be construed as limited to the embodiments set forth herein. Instead, these embodiments are provided for a thorough and complete understanding of the present disclosure. It should be understood that the drawings and embodiments according to the present disclosure are only for illustration rather than intended to limit the protection scope of the present disclosure.

It should be understood that the steps described in the method embodiments according to the present disclosure may be performed in a different order and/or performed in parallel. Furthermore, method embodiments may include additional steps and/or illustrated steps may not be performed. The scope according to the present disclosure is not limited in this regard.

Herein, the term "including" and its variants are open-ended inclusion, i.e., "including but not limited to". The term "based on" is "based at least in part on". The term "an embodiment" indicates "at least one embodiment." The term "another embodiment" indicates "at least one additional embodiment". The term "some embodiments" indicates "at least some embodiments". Relevant definitions of other terms are given in the description below.

It should be noted that concepts such as "first" and "second" herein are for distinguishing apparatuses, modules or units only, neither defining that these apparatuses or units must be different from each other nor defining the order or interdependence of functionalities performed by these apparatuses, modules or units.

It should be noted that the determiners such as "a" and "a plurality" herein are illustrative rather than restrictive. It should be understood by those skilled in the art that unless the context clearly dictates otherwise, "a" and "a plurality" should be construed as "one or more".

The name of a message or information exchanged between multiple apparatuses according to the embodiments of the present disclosure are only for illustrative purpose rather than limiting the scope of the message or information.

In the embodiment of the present disclosure, the first connection number and the first window number are determined. The first connection number is the number of first target projection sources connected to a projection device before disconnection. The first window number is the number of target windows that are already opened on the projection device.

In the embodiment of the present disclosure, the target window is for displaying projection information mirrored from the projection source to the projection device.

In the embodiment of the present disclosure, the window is for displaying the projection information mirrored from the projection source to the projection device.

In the embodiment of the present disclosure, the connection instruction and the window opening instruction are acquired. The connection instruction is for instructing the projection device to connect to the projection source. The connection instruction is for instructing to connect a projection device to a projection source. The window opening instruction is for instructing to open a window on the projection device.

In the embodiment of the present disclosure, the window opening instruction may be triggered locally by a user terminal. The user terminal sends the window opening instruction to the projection device. The user terminal may be an application program of the projection device, for example, an APP client, or may be a remote-control terminal for controlling the projection device. The connection instruction is triggered by the projection source. The projection source may send the connection instruction to the projection device through a wireless local area network Wi-Fi. The window opening instruction and the connection instruction are sent to the projection device respectively by the user terminal and the projection source respectively, thereby avoiding false connections caused by the user terminal sending the window opening instruction and the connection instruction at the same time, and avoiding a window opened unnecessarily caused by the projection source sending the window opening instruction and the connection opening instruction at the same time.

In the embodiment of the present disclosure, a window of a projection device may display labels of multiple projection sources, for example, alternately. A state displayed on a label of any one of the multiple projection sources may include any one of off, selected, and on. The state displayed on the label may indicate the connection status between the projection source and the projection device. For example, off indicates that the projection source is not connected to the projection device, selected indicates that the projection source is to be connected to the projection device, and on indicates that the projection source is already connected to the projection device.

In the embodiment of the present disclosure, the first connection number is greater than or equal to 2. The first window number is greater than or equal to 1. The first connection number is the number of first target projection sources connected to the projection device before the disconnection.

In the embodiment of the present disclosure, as shown in FIG. 1, the first connection number is 2, and the first window number is 1. The labels of the three projection sources displayed on a toolbar 102 of the only opened window 101 of the projection device are a device 103, a device 104 and a device 105 respectively. Each projection source connected to the projection device is defined as a first target projection source. Each window that is opened is defined as a target window. The label of the projection source may indicate connection states between the projection device and the projection source in respective display styles. The label of the projection source may include three states, namely, off, on, and selected. The label of the projection source that is gray indicates the state off, that is, the projection device is disconnected from the projection source, for example, the device 103. The label of the projection source that is blue or white indicates the state on, that is, the projection device is connected to the projection source successfully, for example, the devices 104 and 105. The state selected indicates that the user clicks the label of the projection source, that is, selects the projection source to project projection information to the projection device.

Figure 2:
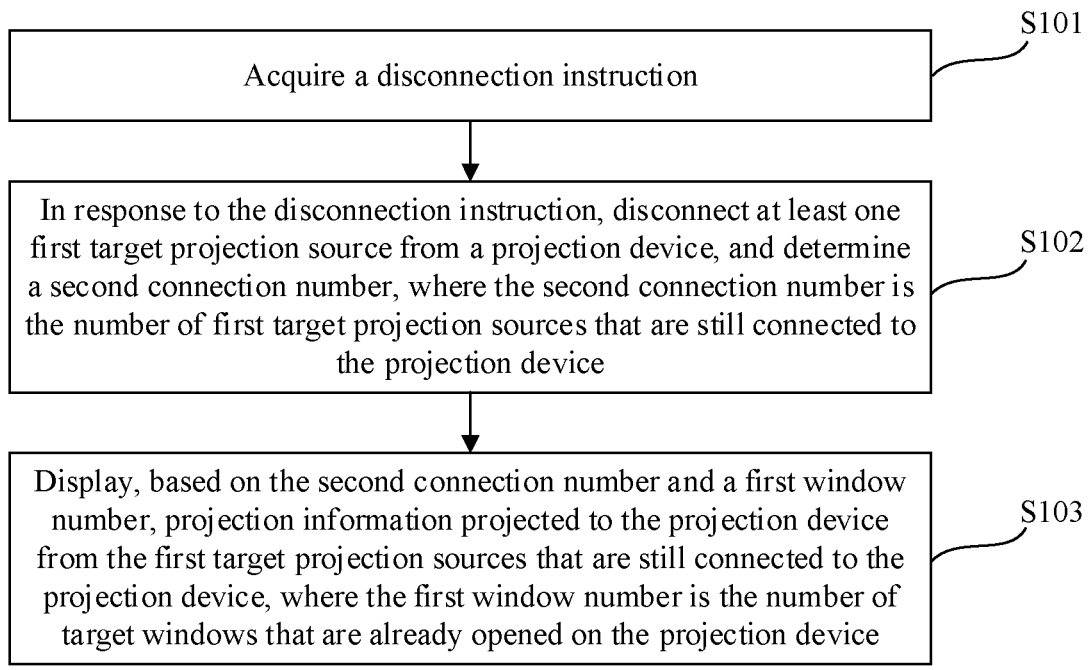
FIG. 2 is a schematic flowchart illustrating a method for screen mirroring according to an embodiment of the present disclosure.

A method for screen mirroring is provided according to an embodiment of the present disclosure. FIG. 2 shows a schematic flowchart of the method. The method includes the following steps S101 to S103.

In S101, a disconnection instruction is acquired.

In the embodiment of the present disclosure, the disconnection instruction is for instructing to disconnect at least one first target projection source from the projection device. In an embodiment, the disconnection instruction may be triggered by the projection source, and sent by the projection source to the projection device. In other embodiments, the disconnection instruction may be triggered by other devices, which is not limited in the present disclosure.

In S102, in response to the disconnection instruction, at least one first target projection source is disconnected from the screen device, and the second connection number is determined. The second connection number is the number of first target projection sources that are still connected to the projection device.

In an embodiment, N first target projection sources are already connected to the projection device. When it is detected that M first target projection sources are disconnected from the projection device, it is determined that the number of first target projection sources that are still connected to the projection device is N−M, that is, N minus M. Both N and M are positive integers, N is greater than M, the first connection number is N, and the second connection number is N−M.

For example, 3 first target projection sources are connected to the projection device. When it is detected that one first target projection source is disconnected from the projection device, it is determined that the number of first target projection sources that are still connected to the projection device is 2, that is, 3 minus 2. The first connection number is 3, and the second connection number is 2.

In another embodiment, the projection device disconnects S first target projection sources from the projection device in response to the disconnection instruction. When detecting that K first target projection sources are still connected to the projection device, the projection device determines that the second connection number is K. Both S and K are positive integers.

In S103, projection information mirrored from the first target projection sources that are still connected to the projection device is displayed based on the second connection number and a first window number. The first window number is the number of target windows that are already opened on the projection device.

In the embodiment of the present disclosure, the projection information includes media information of various types, real-time operation images, and the like.

In the embodiment of the present disclosure, the projection information mirrored from the first target projection sources that are still connected to the projection device is displayed based on the second connection number and a first window number as follows. In a case that the second connection number is less than the first window number, target windows of the second window number are closed, where the second window number is less than the first window number, and the projection information mirrored to the projection device from the first target projection sources that are still connected to the projection device is displayed in target windows that are not closed. Alternatively, in a case that the second connection number is greater than or equal to the first window number, target windows of the first window number remain open, and the projection information mirrored to the projection device from the first target projection sources that are still connected to the projection device is displayed in the target windows of the first window number.

In the embodiment of the present disclosure, the first window number may be equal to or greater than the first connection number. In a case that second connection number is less than the first window number, all or part of unwanted target windows are closed, so that the number of target windows that remain open is equal to or greater than the number of first target projection sources that are still connected to the projection device. Therefore, there are an appropriate number of target windows for displaying the projection information of the first target projection sources that are still connected to the projection device.

In the embodiment of the present disclosure, in a case that the second connection number is less than the first window number, target windows of the second window number may be closed. The second window number is smaller than the first window number. In a case that the second connection number is N−M and the first window number is N, that is, the first window number is equal to the first connection number, it is determined that the number of N−M target projection sources that are still connected to the projection device is less than the number of N target windows that are opened on the projection device, and that the number of unwanted target windows is M, that is, the second window number of is M. The M unwanted target windows are closed, and N−M target windows that are already opened remain open. In this way, the number of open target windows is equal to the number of first target projection sources that are still connected to the projection device, that is, N−M. Alternatively, some unwanted target windows are closed, that is, F unwanted target windows are closed, and N−F target windows are remained open. The number of unwanted target windows that remain open is M−F. N, M and F are all positive integers, N is greater than M, and M is greater than F.

In the embodiment of the present disclosure, in a case that the second connection number is less than the first window number, target windows of the second window number may be closed. The second window number is smaller than the first window number. In a case that the second connection number is N−M, the first window number is H, and the first window number H is greater than the first connection number N, it is determined that the number of N−M first target projection sources that are still connected to the projection device is smaller than the number of H target windows that are already opened on the projection device, and the number of unwanted target windows is H−N+M. That is, the second window number is H−N+M. The H−N+M unwanted target windows are closed. N−M target windows that are already opened remain open. Therefore, the number of target windows that remain open is equal to the number of the first target projection sources that are still connected to the projection device. Alternatively, unwanted target windows are partly closed. That is, F unwanted target windows are closed. H−F target windows remain open. The number of unwanted target windows that remain open is H−N+M−F. H, N, M, and F are all positive integers, and N is greater than M and M is greater than F.

In the embodiment of the present disclosure, after at least one first target projection source is disconnected from the projection device, one or more target windows are to be closed accordingly if the number of first target projection sources that are still connected to the projection device is less than the number of target windows that are already opened on the projection device, thereby saving window resources and improving user experience.

In the embodiment of the present disclosure, the at least one first target projection source is disconnected from the projection device as follows. One first target projection source is disconnected from the projection device. Before the first target projection source is disconnected from the projection device, projection information mirrored by the first target projection source to the projection device is displayed on target windows of the first connection number. The first connection number is the number of first target projection sources already connected to the projection device before the disconnection.

Correspondingly, the projection information mirrored by the first target projection sources that are still connected to the projection device to the projection device is displayed as follows. The projection information mirrored to the projection device from the first target projection sources that are still connected to the projection device is displayed by switching.

In the embodiment of the present disclosure, after the first target projection source is disconnected from the projection device, the method further includes: closing at least one target window that was opened last.

In the embodiment of the present disclosure, for example, the first target projection source disconnected from the projection device is projection source A. The first target projection source that is not disconnected from the projection device is a projection source B. Each window that is already opened on the projection device is defined as the target window. The first connection number is 2, the first window number is 2 or 3, and the second connection number is 1. Based on this, for example, the projection sources A and B are already connected to the projection device, 2 or 3 windows are opened to display content mirrored by the projection source A to the projection device. In this case, when the projection source A is actively or passively disconnected from the projection device, one or two windows that were opened last are closed and only one window remains open. Content mirrored by the projection source B to the projection device is automatically switched to be displayed. That is, the window that remains open displays the content of the projection source B.

In the embodiment of the present disclosure, for example, the first target projection source disconnected from the projection device is a projection source A. The first target projection sources that are still connected to the projection device are projection sources B and C. Each window that has been opened on the projection device is defined as the target window. The first connection number is 3, the first window number is 3, the second connection number is 2, and the second window number is 1. Based on this, for example, three projection sources A, B, and C are already connected to the projection device, and three windows that are already open all display content mirrored by the projection source A to the projection device. In this case, when the projection source A is actively or passively disconnected from the projection device, one window that was opened last are closed. 2 windows remain open. Content mirrored by the projection sources B and C to the projection device is automatically switched to be displayed. That is, the two windows that remain open display projection information mirrored by the projection sources B and C to the projection device respectively.

In the embodiment of the present disclosure, in a case that the second connection number is greater than or equal to the first window number, the first window number of the target windows remain open. The projection information mirrored by the first target projection sources that are still connected to the projection device to the projection device is displayed based on the first window number of the target windows.

In the embodiment of the present disclosure, for example, the first target projection source disconnected from the projection device is a projection source A. The first target projection sources that are still connected to the projection device are projection sources B and C. Each window that has been opened on the projection device is defined as the target window. The first connection number is 3, the first window number is 1, and the second connection number is 2. Based on this, for example, the three projection sources A, B, and C are already connected to the projection device, and only one window is opened to display content mirrored by the projection source A to the projection device. In this case, the device A actively disconnects from the projection device, and no window is closed. The current window is automatically switched to display content mirrored by the projection source B or C to the projection device. The projection source to be switched may be either one of the projection sources B and C. Alternatively, the projection source to be switched is one of the projection sources B and C that is connected to the projection device last.

In the embodiment of the present disclosure, the projection information mirrored to the projection device from the first target projection sources that are still connected to the projection device is displayed on the target windows of the first window number as follows. Projection information mirrored to the projection device by a third connection number of first target projection sources that are still connected to the projection device is displayed in the first window number of target windows.

The third connection number is less than or equal to the first window number. The first target projection sources of the third connection number are determined based on a time sequence of connections between the first target projection sources and the projection device.

In the embodiment of the present disclosure, the projection information mirrored by the third connection number of the connected first target projection sources to the projection device is displayed in the first window number of the target windows as follows. Projection information mirrored to the projection device by different first target projection sources or the same first target projection source among the third connection number of the first target projection sources is displayed in the first window number of the target windows.

In the embodiment of the present disclosure, for example, the first target projection source disconnected from the projection device is a projection source A. The first target projection sources that are still connected to the projection device are projection sources B and C. Each window that has been opened on the projection device is defined as the target window. The first connection number is 3, the first window number is 2, and the third connection number is 2. Based on this, for example, three projection sources A, B, and C are connected to the projection device, and only two windows are opened, both of which display content mirrored by the projection source A to the projection device. In this case, when the projection source A is actively or passively disconnected from the projection device, no window is closed. These two windows are automatically switched to content mirrored by the projection sources B and C to the projection device, where the projection sources B and C are the last two projection sources connected to the projection device. Alternatively, the two windows are automatically switched to content mirrored by the projection source B to the projection device, where the projection source B is the projection source that was last connected to the projection device. Alternatively, the two windows are automatically switched to content mirrored by the projection source C to the projection device, where the projection source C is the projection source that was last connected to the projection device.

In the embodiment of the present disclosure, all the first target projection sources that have been connected to the projection device are disconnected from the projection device when it is detected that all the target windows are off.

In the embodiment of the present disclosure, if all windows on the projection device are closed, the projection device disconnects all first target projection sources that have been connected to the projection device. For example, 2 or 3 first target projection sources have been connected to the projection device, and only one window has been opened on the projection device. In this case, the user clicks a close button to close the window. A dialog box pops up before the window closes: "Close the application will disconnect all connections. To disconnect the current connection, please click the return button. To disconnect all connections? OK/Return".

Figure 3:
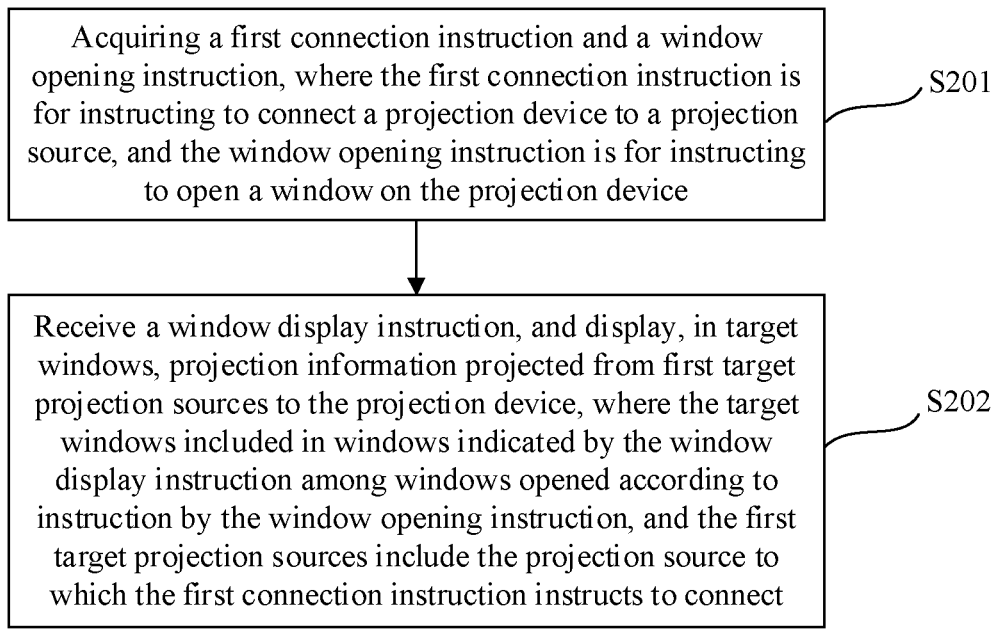
FIG. 3 is a schematic flowchart illustrating a method for screen mirroring according to another embodiment of the present disclosure.

A method for screen mirroring is provided according to another embodiment of the present disclosure. FIG. 3 shows a schematic flowchart of the method. The method includes the following steps S201 to S202.

In S201, a first connection instruction and a window opening instruction are acquired. The first connection instruction is for instructing to connect a projection device to a projection source. The window opening instruction is for instructing to open a window on the projection device.

In the embodiment of the present disclosure, the window is for displaying the projection information mirrored by the projection source to the projection device.

Figure 4:
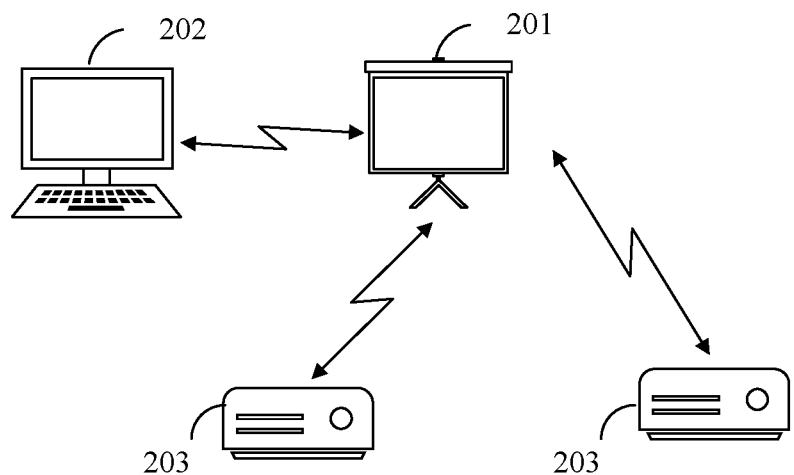
FIG. 4 is a schematic diagram illustrating a system architecture for screen mirroring according to an embodiment of the present disclosure.

In the embodiment of the present disclosure, as shown in FIG. 4, the window opening instruction may be triggered by a user terminal 202. The user terminal 202 sends the window opening instruction to the projection device 201. The user terminal 202 may be an application program APP client of the projection device 201. The connection instruction may be triggered by the projection source 203. The projection source 203 may send the connection instruction to the projection device 201 through the wireless local area network Wi-Fi. In the embodiment, the user terminal sends the window opening instruction to enable a screen mirroring service of the projection device, so that the projection source does not mis-operate to project the content to the projection device. In other words, in a case that the screen mirroring service of the projection device 201 is disenabled, the projection source 203 fails to mirror content to the projection device 201 forcedly. For example, the user terminal 202 sends the window opening instruction to instruct the projection device 201 to open at least one window. The projection device 201 starts the screen mirroring service in response to the window opening instruction. Thereafter, the projection source may mirror content to the projection device 201.

In S202, a window display instruction is received, and projection information mirrored from first target projection sources to the projection device is displayed in target windows. The target windows are included in windows indicated by the window display instruction among windows opened on the instruction of the window opening instruction. The first target projection sources include the projection source connected to the projection device on the instruction of the first connection instruction.

In the embodiment of the present disclosure, the window display instruction is for instructing to display the projection information mirrored by the projection source to the projection device in the target window. For example, the projection device is already connected to three first target projection sources. Three windows on the projection device are opened at the same time. The window display instruction instructs to display the projection information mirrored by the three first target projection sources to the projection device in the three windows, respectively.

In the embodiment of the present disclosure, the first connection number and the first window number are determined. The first connection number is the number of the first target projection sources connected to the projection device. The first window number is the number of target windows that have been opened on the projection device. A second connection instruction is acquired. The second connection instruction is for instructing the projection device to connect to a second target projection source. Projection information mirrored by the second target projection source to the projection device is displayed based on the first connection number and the first window number. The second target projection source is a projection source other than each of the first target projection sources.

In the embodiment of the present disclosure, the projection information mirrored by the second target projection source to the projection device is displayed based on the first connection number and the first window number as follows. In a case that the first connection number is less than a first preset threshold and the first window number is equal to a second preset threshold, the projection information mirrored by the second target projection source to the projection device is displayed in at least one of the two target windows displaying the projection information mirrored by the same first target projection source. Alternatively, in a case that the first connection number is equal to the first preset threshold, the projection information mirrored by the second target projection source to the projection device is displayed in at least one of the target windows in response to the received disconnection instruction. The disconnection instruction is for instructing to disconnect at least one of the first target projection sources from the projection device.

In the embodiment of the present disclosure, in a case that the first connection number is less than the first preset threshold and the first window number is equal to the second preset threshold, the projection information mirrored by the second target projection source to the projection device is displayed in at least one of the two target windows displaying the projection information mirrored by the same first target projection source. For example, the first connection number is 2, the first window number is 3, the first preset threshold is 3, and the second preset threshold is 3. Each window that has been opened on the projection device is defined as the target window. A window 1 displays content mirrored by a projection source 1 to the projection device. A window 2 displays content mirrored by the projection source 1 to the projection device. A window 3 displays content mirrored by a projection source 2 to the projection device. A projection source 3 is the second target projection source. In response to the projection source 3 being connected to the projection device, the window 1 or the window 2 may be selected to display content mirrored by the projection source 3 to the projection device. For example, the window 1 is selected to display content mirrored by the projection source 3 to the projection device.

In the embodiment of the present disclosure, the projection information mirrored by the second target projection source to the projection device is displayed in at least one of the target windows in response to the received disconnection instruction as follows. In response to the received disconnection instruction, the target window is determined as a display window for the second target projection source newly connected to the projection device, so as to display the projection information mirrored by the second target projection source to the projection device. The disconnection instruction instructs to disconnect the first target projection source from the projection device. The projection information mirrored by the first target projection source to the projection device is displayed in the display window.

For example, the first connection number is 3. The first window number is 3. The first preset threshold is 3. The second preset threshold is 3. Each window that has been opened on the projection device is defined as the target window. Based on this, a projection source 1, a projection source 2, and a projection source 3 serve as the first target projection sources. A projection source 4 serves as the second target projection source. A window 1 displays content mirrored by the projection source 1 to the projection device. A window 2 displays content mirrored by the projection source 2 to the projection device. A window 3 displays content mirrored by the projection source 3 to the projection device. The received disconnection instruction instructs to disconnect the projection source 1 from the projection device, and the window 1 is determined as a display window of the projection source 4 newly connected to the projection device, so as to display projection information mirrored by the projection source 4 to the projection device.

In the embodiment of the present disclosure, the projection information mirrored by the second target projection source to the projection device is displayed in at least one of in the target windows in response to the received disconnection instruction as follows. In response to the received disconnection instruction, at least one target window is determined based on at least one of a target window having a focus among the target windows, a prompt of each of the target windows, and a preset selection box. The projection information mirrored by the second target projection source to the projection device is displayed in the at least one target window.

For example, the first connection number is 3. The first window number is 3. The first preset threshold is 3. The second preset threshold is 3. Each window that has been opened on the projection device is defined as the target window. Based on this, projection sources 1, 2 and 3 serve as first target projection sources. A projection source 4 serves as the second target projection source. A window 1 displays content mirrored by the projection source 1 to the projection device. In response to the projection source 2 being newly connected to the projection device, a window 2 is opened. In response to the projection source 3 being newly connected to the projection device, a window 3 is opened. In response to the projection source 4 being to connect to the projection device, the window that currently has a focus pops up to remind the user. For example, the window 2 that currently has a focus pops up to remind the user whether to disconnect the projection source 2 from the projection device and connect the projection source 4 to the projection device. Alternatively, a selection box pops up to ask which of the projection source 1, the projection source 2, and the projection source 3 to be disconnected from the projection device in order to connect the projection source 4. Alternatively, no matter whether there is a window has a focus or not, a prompt pops up to prompt the user to click to disconnect one of the projection source 1, the projection source 2 and the projection source 3 from the projection device in order to connect the projection source No. 4.

In the embodiment of the present disclosure, the first preset threshold represents the maximum number of projection sources that the projection device can connects to. The second preset threshold represents the maximum number of windows can be opened on the projection device. The first preset threshold and the second preset threshold are integers greater than or equal to 1.

In the embodiment of the present disclosure, for example, the first preset threshold is 3, that is, the maximum number of projection sources that the projection device can connect to is 3. The second preset threshold is 3, that is, the maximum number of windows that can be opened on the projection device is 3.

In the embodiment of the present disclosure, in a case that the screen mirroring service of the projection device is disenabled, the projection source fails to mirror content to the projection device forcedly, which avoids screen mirroring performed by mistake, thereby saving window resources and improving user experience.

Figure 5:
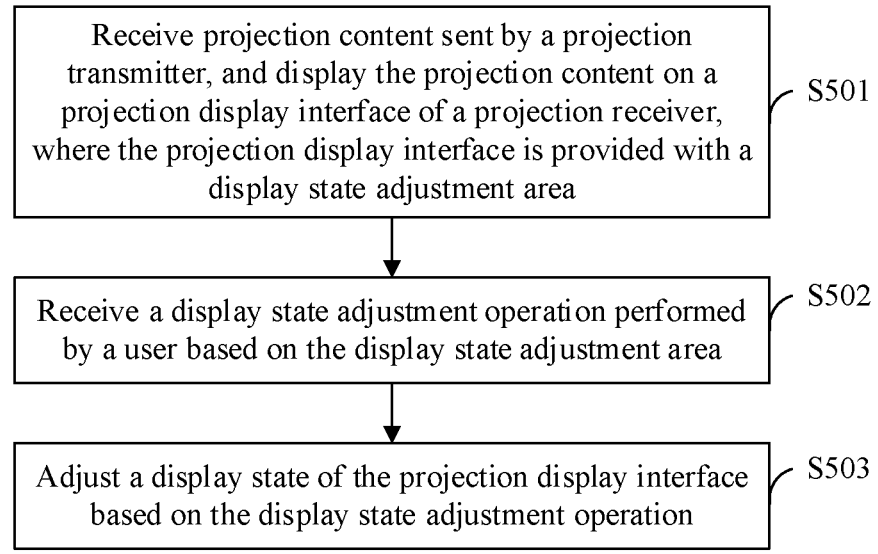
FIG. 5 is a schematic flowchart illustrating a method for screen mirroring according to another embodiment of the present disclosure.

A method for screen mirroring is provided according to another embodiment of the present disclosure. As shown in FIG. 5, the method includes the following steps S501 to S503.

In step S501, projection content sent by a projection transmitter is received, and is displayed on a projection display interface of a projection receiver. The projection display interface is provided with a display state adjustment area.

In step S502, a display state adjustment operation performed by a user based on the display state adjustment area is received.

In step S503, a display state of the projection display interface is adjusted based on the display state adjustment operation.

Figure 6:
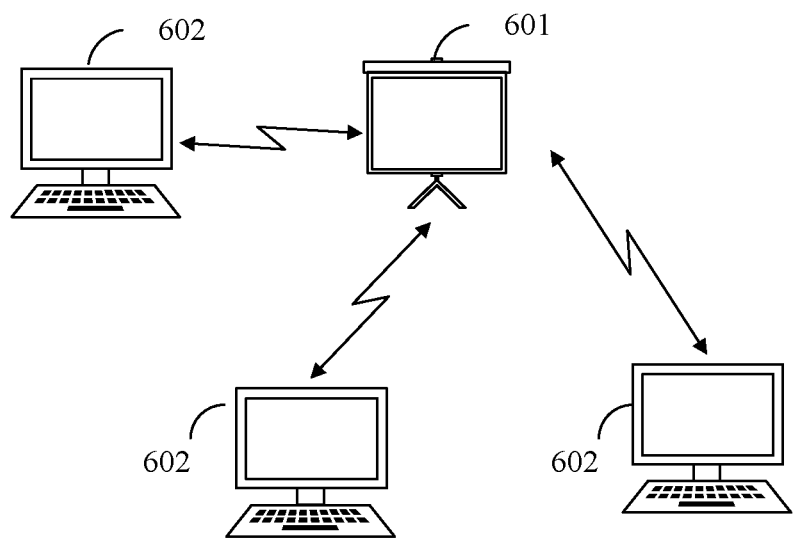
FIG. 6 is a schematic diagram illustrating an application scenario of a method for screen mirroring according to an embodiment of the present disclosure.

In the embodiment of the present disclosure, the projection receiver refers to a terminal for displaying the projection content, for example, a display device such as a liquid crystal display, an electronic ink screen, and a projector. The projection transmitter refers to a terminal for sending the projection content to the projection receiver, for example, electronic devices such as a computer, a mobile phone, and a tablet computer. The projection receiver is connected in communication with the projection transmitter by wired or wireless communication. As shown in FIG. 6, a projection receiver 601 is connected in communication with multiple projection transmitters 602. When being connected in communication with the projection receiver, the projection transmitter sends the projection content to the projection receiver. The projection receiver displays the projection content.

Figure 7:
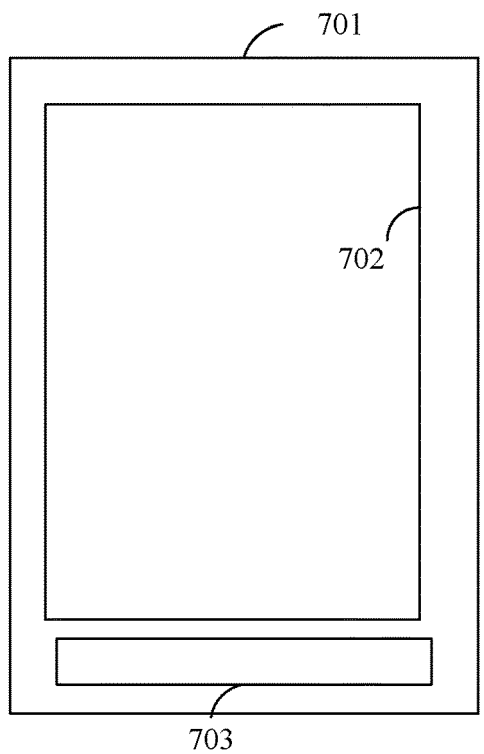
FIG. 7 is a schematic diagram illustrating a projection display interface according to an embodiment of the present disclosure.

In the embodiment of the present disclosure, a specific example is described for the convenience of description. A user performs remote screen mirroring by using a computer. The projection transmitter is the computer, and the projection receiver is a display device capable of communication, for example, a projector. The user on the computer side mirrors a video to the projector via the computer, and the projector displays the video. During the display, the projection receiver receives projection content sent by the projection transmitter, and display the projection content on a projection display interface of the projection receiver. As shown in FIG. 7, a projection display interface 701 displays projection content 702 and a display state adjustment area 703. The display state adjustment operation performed by the user is received through the display state adjustment area 703. The display state of the projection display interface is adjusted based on the display state adjustment operation. Optionally, the display state adjustment operation may be an operation performed by the user directly at the projection receiver or the projection transmitter, or an operation performed by the user via a mobile control terminal such as a mobile phone or a remote control. Based on the display state adjustment operation, the resolution of the projection display interface, the on-off state of the display interface, and a display mode of the display interface may be adjusted.

In the embodiment of the present disclosure, the projection display interface that displays the projection content is provided with a display state adjustment area. A display state adjustment operation performed by a user is received based on the display state adjustment area. A display state of the projection display interface is adjusted based on the display state adjustment operation. In this way, the user can adjust the display state of the projection display interface directly at a projection receiver or through a remote-control device, which is convenient to use.

In a possible embodiment of the present disclosure, the display state adjustment area is provided with a resolution adjustment area. The display state adjustment operation includes a resolution adjustment operation. The display state of the projection display interface is adjusted based on the display state adjustment operation as follows. The display resolution of the projection display interface is adjusted based on the resolution adjustment operation.

In the embodiment of the present disclosure, the state display area of the projection display interface is provided with a resolution adjustment area, and the user may adjust the resolution of the projection display interface based on the resolution adjustment area.

Figure 8:
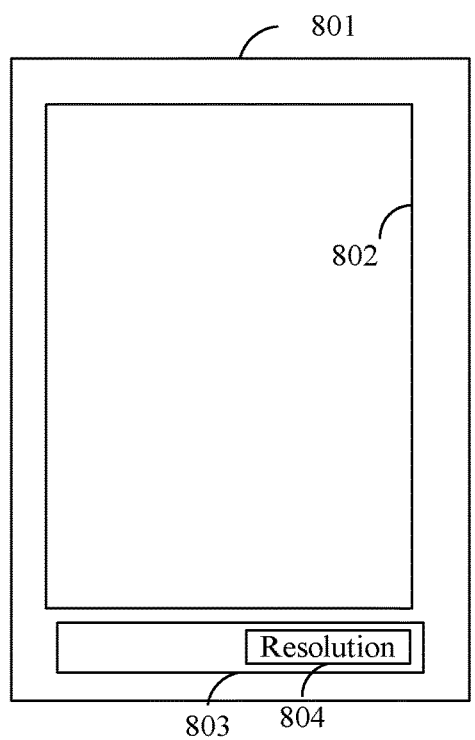
FIG. 8 is a schematic diagram illustrating resolution adjustment according to an embodiment of the present disclosure.

In the embodiment of the present disclosure, a specific example is described for the convenience of description. As shown in FIG. 8, a projection display interface 801 displays projection content 802. A resolution adjustment area 804 is provided in a display state adjustment area 803. The resolution adjustment operation performed by the user is received through the resolution adjustment area 804. The resolution adjustment area 804 may be implemented as a drop-down control. The user clicks the mouse or the like to trigger the resolution adjustment area to display optional resolutions. The user may select a target resolution. The projection transmitter adjusts the resolution of the projection content based on the target resolution, so that the resolution of the projection content is the target resolution.

In the embodiment of the present disclosure, the display state adjustment area is provided with a resolution adjustment area. A resolution adjustment operation performed by the user is received based on the resolution adjustment area. The resolution of the projection display interface is adjusted based on the resolution adjustment operation. In this way, the user can adjust the resolution of the projection content at any time, which is convenient to use.

Figure 9:
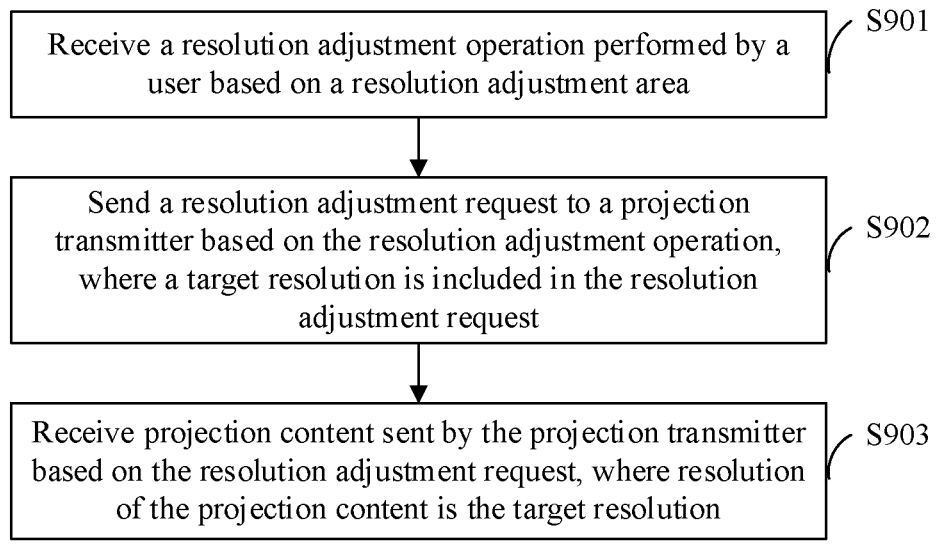
FIG. 9 is a schematic flowchart illustrating a method for resolution adjustment according to an embodiment of the present disclosure.

In a possible embodiment of the present disclosure, the display resolution of the projection display interface is adjusted based on the resolution adjustment operation by the following steps S901 to S903, as shown in FIG. 9.

In step S901, a resolution adjustment operation performed by the user based on the resolution adjustment area is received.

In step S902, a resolution adjustment request is sent to the projection transmitter based on the resolution adjustment operation. A target resolution is included in the resolution adjustment request.

In step S903, projection content sent by the projection transmitter based on the resolution adjustment request is received. The resolution of the projection content is the target resolution.

As in the above embodiment, the resolution adjustment operation performed by the user based on the resolution adjustment area may be received via the projection receiver or a remote-control device. The resolution adjustment request is sent to the projection transmitter based on the resolution adjustment operation. The resolution adjustment request includes the target resolution. The projection transmitter adjusts the resolution of the projection content to the target resolution in response to the resolution adjustment request, and sends the adjusted projection content to the projection receiver for display.

In the embodiment of the present disclosure, the resolution adjustment operation performed by the user is received based on the resolution adjustment area, and the resolution adjustment request is sent to the projection transmitter based on the resolution adjustment operation, so that the projection transmitter adjusts the resolution of the projection content to the target resolution, which is user-friendly.

Figure 10:
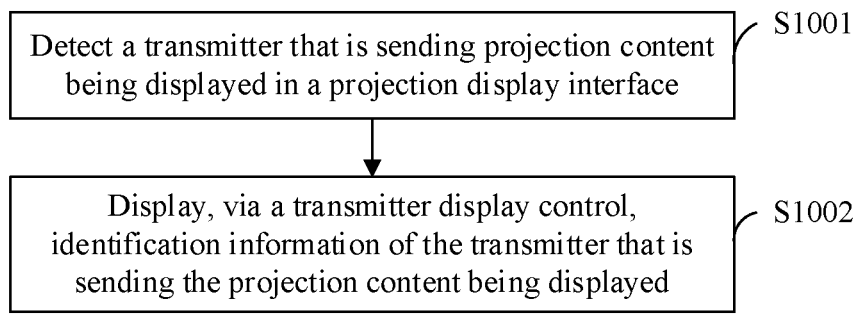
FIG. 10 is a schematic flowchart illustrating a method for displaying a transmitter according to an embodiment of the present disclosure.

In a possible embodiment of the present disclosure, the projection display interface is provided with a transmitter display control. As shown in FIG. 10, the method further includes the following steps S1001 to S1002.

In step S1001, a transmitter, that is sending projection content being displayed or to be displayed in the projection display interface, is detected.

In step S1002, identification information of the transmitter, that is sending the projection content being displayed or to be displayed, is displayed via the transmitter display control.

In the embodiment of the present disclosure, the projection display interface is provided with a transmitter display control, and the identification information of the transmitter of the projection content may be displayed via the control.

Figure 11:
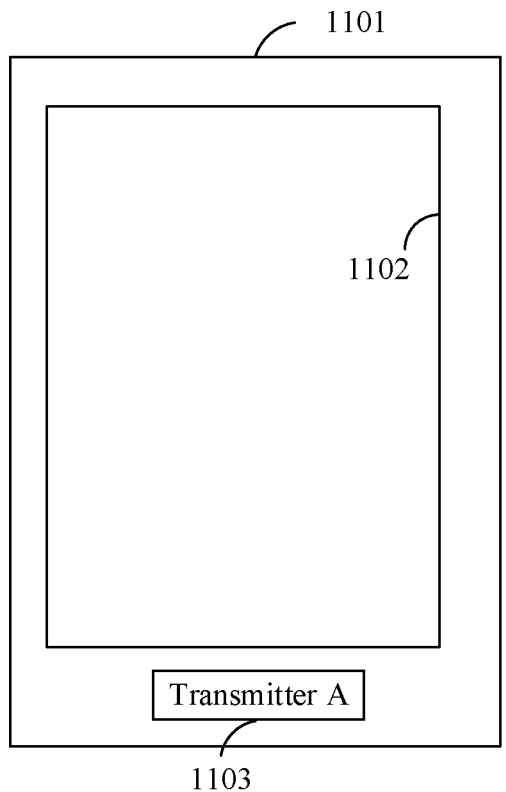
FIG. 11 is a schematic diagram illustrating displaying of a transmitter according to an embodiment of the present disclosure.

In the embodiment of the present disclosure, a specific example is described for the convenience of description. As shown in FIG. 11, a projection display interface 1101 displays projection content 1102 and a transmitter display control 1103. The transmitter display control is for displaying identification information of the transmitter of the projection content. During the screen mirroring, the projection receiver acquires the identification information of the projection transmitter while receiving the projection content sent by the projection transmitter, and displays the identification information of the projection transmitter in the transmitter display control while displaying the projection content. For example, for a projection action, the projection display interface displays the projection content sent by a projection transmitter A. The projection transmitter A is displayed in the transmitter display control during display of the projection content.

In the embodiment of the present disclosure, a transmitter display control is provided on the projection display interface to display the identification information of the transmitter corresponding to the projection content being displayed, so as to help the user to determine the projection source.

Figure 12:
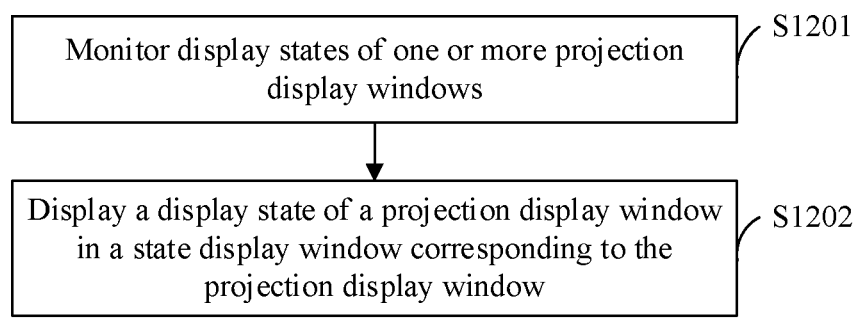
FIG. 12 is a schematic flowchart illustrating a method for displaying a state according to an embodiment of the present disclosure.

In a possible embodiment of the present disclosure, the projection display interface is provided with one or more projection display windows. Each projection display window is provided with a state display control. As shown in FIG. 12, the method further includes the following steps S1201 to S1202.

In step S1201, the display states of the one or more projection display windows are monitored.

In step S1202, a display state of a projection display window is displayed in the state display control corresponding to the projection display window.

In the embodiment of the present disclosure, the number of projection transmitters connected to the projection receiver is acquired. The projection display windows of the number of projection transmitters are created on the display interface of the projection receiver. The multiple projection display windows simultaneously display multiple screen contents respectively, which is suitable for the scenario of multi-terminal screen mirroring. The projection content sent by the multiple projection transmitters are displayed in the multiple projection display windows respectively, so as to improve user experience.

In the embodiment of the present disclosure, when being connected to the projection transmitters, the projection receiver acquires the number of projection transmitters, receives the projection content sent by all the projection transmitters, creates projection display windows of the number of the projection transmitters on the display interface, so as to display the projection contents sent by the projection transmitters respectively.

Figure 13:
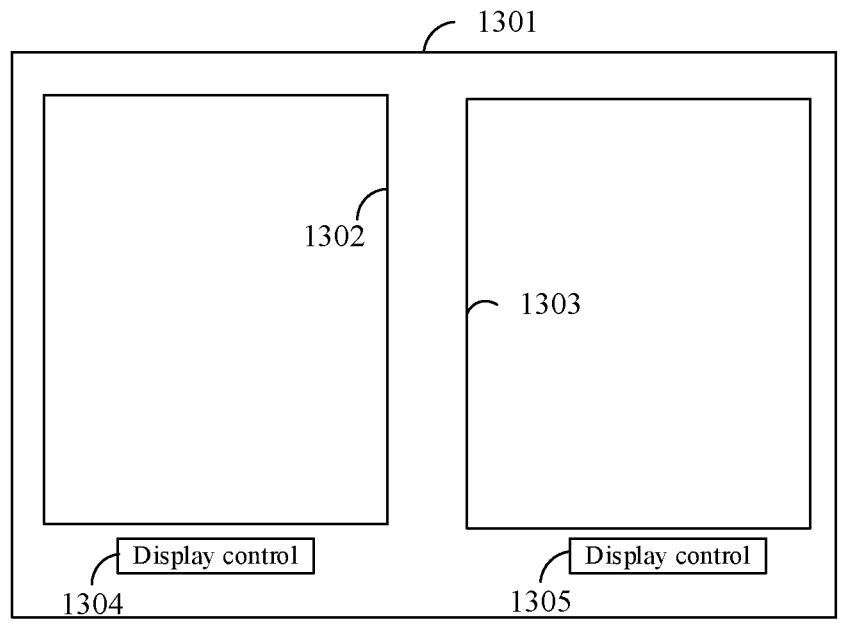
FIG. 13 is a schematic diagram illustrating displaying of a state according to an embodiment of the present disclosure.

In the embodiment of the present disclosure, a specific example is described for the convenience of description. A user performs remote screen mirroring by using a computer. The projection transmitter is the computer, and the projection receiver is a display device capable of communication, for example, a projector. The user on the computer side mirrors a video to the projector via the computer, and the projector displays the video. During the display, when detecting a successful connection to the computer, the projector acquires the number of computers connected to itself. For example, there are two computers connected to the projector, the projector receives projection content, such as videos, sent by the two computers, and creates two projection display windows on a display interface of the projector. As shown in FIG. 13, a display interface 1301 includes a projection display window 1302 and a projection display window 1303, which correspond to a state display control 1304 and a state display control 1305 respectively. After the projection display windows are successfully created, the projector displays projection content sent by the two computers in the two projection display windows respectively. For example, the projection display window 1302 displays the projection content sent by the first computer, and the projection display window 1303 displays the projection content sent by the second computer.

In the embodiment of the present disclosure, in a case that multiple projection display windows are simultaneously displayed on the projection display interface, the display state of each of the multiple projection display windows is detected. The display state of the projection display window is displayed on state display control corresponding to the projection display window. The display state of the projection display window may indicate the connection between the projection device and the projection transmitter, for example, whether the projection device is connected to a projection transmitter, the projection device is to be connected to a projection transmitter, or the projection device has already been connected to a projection transmitter. In other words, the display state may include a first state, a second state or a third state. The first state indicates that the current window displays no projection content. The second state indicates that the current window is selected for displaying projection content. The third state indicates that the current window is displaying projection content. For example, the first, the states are indicated by off, on, or selected. Off indicates that the projection display window is shut down and displays no projection content. On indicates that the projection display window is displaying projection content. Selected indicates that the projection display window is selected, and may be operated. The display states may be represented by text or by indicator lights of different colors, which are not limited according to the present disclosure. In an example, the display state adjustment area also displays identification information of a projection transmitter that is mirroring or is to mirror projection content to the window. For example, the window 1 may be highlighted in order to indicate that the window 1 is already selected to display projection content of a mobile phone 1. The logo of the mobile phone 1 may be displayed in the display state adjustment area of the window 1, indicating that the mobile phone 1 is to mirror content to the window 1. The setting of the first state, the second state or the third state is convenient for the user to confirm whether the projection information is correct, so that the projection transmitter or projection window cannot be selected by mistake, thereby improving accuracy and efficiency of screen mirroring.

In the embodiment of the present disclosure, the display state of the projection display window is detected, and is displayed on the state display control, so that the user can understand the display state of each window.

In a possible embodiment of the present disclosure, the projection display interface is provided with a projection display window. The display state adjustment area is provided with a projection content switching area. The display state adjustment operation includes a projection content switching operation. The display state of the projection display interface is adjusted based on the display state adjustment operation as follows. The projection content displayed in the projection display window is switched based on the projection content adjustment operation. Alternatively, one or more projection display windows are adjusted based on the projection content adjustment operation, to display projection content sent by the same projection transmitter.

In the embodiment of the present disclosure, the projection display interface is provided with multiple projection display windows. The multiple projection display windows may display different projection contents, or may display the same projection content. Each projection display window is provided with a projection content switching area. The projection content switching operation performed by the user is received based on the projection content switching area. Based on the operation, the projection content displayed in the projection display window is switched.

In the embodiment of the present disclosure, multiple windows display multiple projection contents or multiple windows display the same projection content, such that the screen mirroring is diversified.

In a possible embodiment of the present disclosure, the projection display interface is provided with a projection display window. The method further includes: when it is detected that the number of projection transmitters changes, updating the number of projection display windows to match the changed number of projection transmitters.

In the embodiment of the present disclosure, in the process of displaying the projection content sent by the projection transmitter, when detecting that the number of projection transmitters changes, the projection receiver acquires the changed number of projection transmitters and updates the number of projection display windows in the projection display interface and the changed number of projection transmitters, so that the updated number of projection display windows is consistent with or matched with the changed number of the projection transmitters (For example, the number of projection display windows is updated to be equal to the changed number of the projection transmitters. Alternatively, the updated number of windows and/or the updated number of transmitters connected to the projection receiver are determined based on a threshold of the number of windows and/or a threshold of the number of transmitters connected to the projection receiver. For example, in a case that the updated number of transmitters is greater than or equal to the number of windows, the number of windows remains unchanged, and the number of transmitters is updated). The projection receiver adjusts the display state of the updated projection display window. For a projection display window, the display state may include display parameter information of the projection display window and/or display parameter information of the content displayed in the projection display window. For example, the projection receiver adjusts the size and the resolution of the projection display window, the number of transmitters that are mirroring screen to the projection receiver, and identification information of projection transmitters that are mirroring screen to the projection receiver.

In the embodiment of the present disclosure, a specific example is described for the convenience of description. A user performs remote screen mirroring by using a computer. The projection transmitter is the computer, and the projection receiver is a display device capable of communication, for example, a projector. The user on the computer side mirrors a video to the projector via the computer, and the projector displays the video. The projector is currently connected to three computers, for example. Three projection display windows are displayed on the projection screen display interface of the projector to display the projection content sent by the three computers, respectively. When detecting that one of the three computers is disconnected from the projector, the projector determines that the number of computers connected to itself is two, and updates the number of projection display windows in the projection screen display interface to 2. Optionally, the size and the resolution of the two projection display windows may be adjusted to match the size of the display interface of the projector.

In the embodiment of the present disclosure, when it is detected that the number of projection transmitters connected to the projection receiver changes, the number of projection display windows in the projection display interface of the projection receiver is updated, and the display state of each projection display window is adjusted to adapt to the projection display interface. Therefore, the state of the projection display window is automatically adjusted based on the number of transmitters, thereby improving the user experience.

In a possible embodiment of the present disclosure, the projection display interface is provided with a projection display window. The method further includes: determining a type of projection content sent by each projection transmitter, and adjusting a display mode of a projection display window corresponding to the projection transmitter based on the type of projection content.

In the embodiment of the present disclosure, the display mode of the projection display window includes a movie mode, a text mode and the like. The projection content displayed in the projection display window varies from one display mode to another. For example, in the movie mode, the content is displayed with a high resolution and a high frame rate in the projection display window, so as to improve the viewing experience. In the text mode, the content is displayed with a low resolution and a low frame rate in the projection display window, so as to improve the response speed. The display mode of each projection display window may be determined based on the number of projection display windows in the projection display interface or the display content of each projection display window. For example, when there are a large number of projection display windows in the projection display interface, all windows are set to be in a display mode with a low resolution and a low frame rate, or a window displaying a movie is set in the movie mode.

In the embodiment of the present disclosure, a specific example is described for the convenience of description. A user performs remote screen mirroring by using a computer. The projection transmitter is the computer, and the projection receiver is a display device capable of communication, for example, a projector. The user on the computer side mirrors a video to the projector via the computer, and the projector displays the video. For example, the projector is connected to two computers, the projection contents of the two computers are displayed in two projection display windows respectively. The projection content sent by the computer 1 is a movie, and thus the display mode of the projection display window corresponding to the computer 1 is adjusted to a movie mode based on the fact that the projection content is a movie. The projection content sent by the computer 2 is text, and thus the display mode of the projection display window corresponding to the computer 2 is adjusted to the text mode based on the fact that the projection content is text. Optionally, the projector is connected to 8 computers, and thus the display modes of all projection display windows are adjusted to the display mode with a low resolution and a low frame rate based on the fact that the number of computers connected to the projector is 8.

In the embodiment of the present disclosure, the display mode of the projection display window is automatically adjusted based on the number of projection display windows and the display content of each window, so as to adapt to the number of windows and the display content of each window, thereby providing customers with a better viewing experience.

In a possible embodiment of the present disclosure, the display state adjustment area is provided with a display mode adjustment area. The display state adjustment operation includes a display mode adjustment operation. The display state of the projection display interface is adjusted based on the display state adjustment operation as follows. The display mode of the display interface is adjusted based on the display mode adjustment operation.

In the embodiment of the present disclosure, a window adjustment area is provided in the projection display interface of the projection receiver. The user adjusts the display mode of the projection display window through the window adjustment area.

Figure 14:
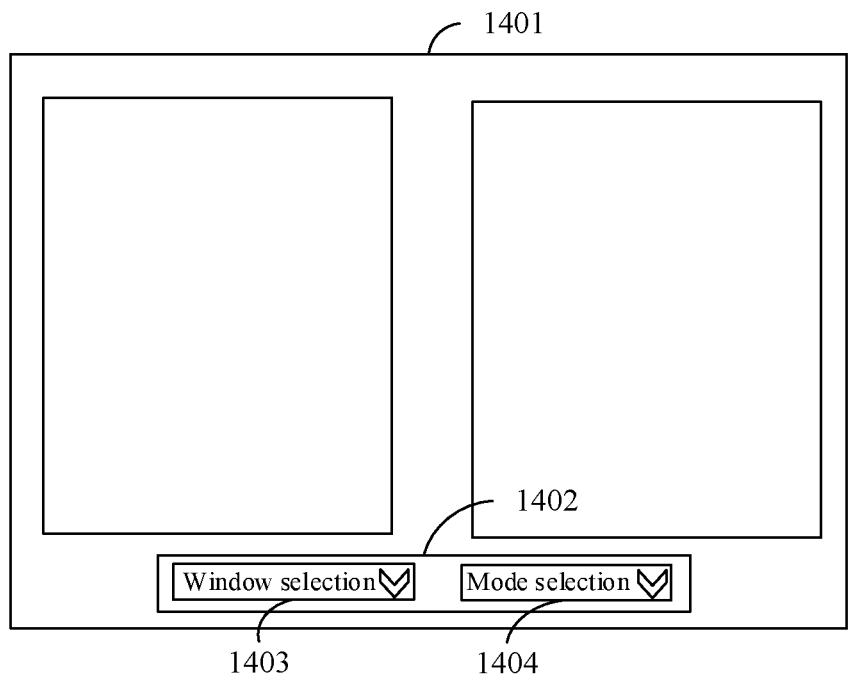
FIG. 14 is a schematic diagram illustrating window selection according to an embodiment of the present disclosure.

In the embodiment of the present disclosure, a specific example is described for the convenience of description. As shown in FIG. 14, a window adjustment area 1402 is provided in a projection display interface 1401. A window selection control 1403 for selecting a window is provided in the window adjustment area 1402. The user selects a window to be adjusted through the window selection control. A display mode selection control 1404 is also provided in the window adjustment area. The user selects a display mode of the selected window through the display mode selection control 1404. As shown in FIG. 11, the number of projection display windows and labels the projection display windows, such as a window 1, a window 2, and a window 3 may be displayed in the window selection control. The user selects a window by clicking the label corresponding to the window, and then selects the display mode of the window such as a text mode and a movie mode via the display mode selection control.

In the embodiment of the present disclosure, by receiving the adjustment operation performed by the user based on the display mode adjustment area of the window to adjust the display mode of the window, the user can adjust the selection mode of each window as needed, which has strong applicability.

In a possible embodiment of the present disclosure, the projection display interface is provided with one or more projection display windows. The method further includes: detecting projection display content displayed in the one or more projection display windows; and adjusting display modes of the one or more projection display windows based on the projection content displayed in respective projection display windows.

In the embodiment of the present disclosure, the projection receiver detects the display content of each projection display window periodically or when certain conditions are met. When a type of display content of a projection display window changes, the projection receiver adjusts a display mode of the window to adapt to the changed display content.

In the embodiment of the present disclosure, a specific example is described for the convenience of description. A user performs remote screen mirroring by using a computer. The projection transmitter is the computer, and the projection receiver is a display device capable of communication, for example, a projector. The user on the computer side mirrors a video to the projector via the computer, and the projector displays the video. For example, the projector is connected to two computers, and the projection contents of the two computers are displayed in two projection display windows respectively. Both the computer 1 and the computer 2 send text to the projector, and thus the display modes of the two projection display windows are both the text mode. The projector periodically detects the projection contents of the two projection windows. When detecting that the content displayed in the window 1 is changed to a movie, the projector adjusts the display mode of the window 1 to the movie mode.

In the embodiment of the present disclosure, the projection receiver monitors the projection content displayed in the projection display window. When the type of projection content in a projection display window changes, the projection receiver automatically adjusts the display mode of the projection display window to a display mode adapted to the changed display content, thereby improving viewing experience.

In a possible embodiment of the present disclosure, the projection display interface is provided with one or more projection display windows. Each projection display window may be provided with one or more display parameter adjustment areas.

Figure 15:
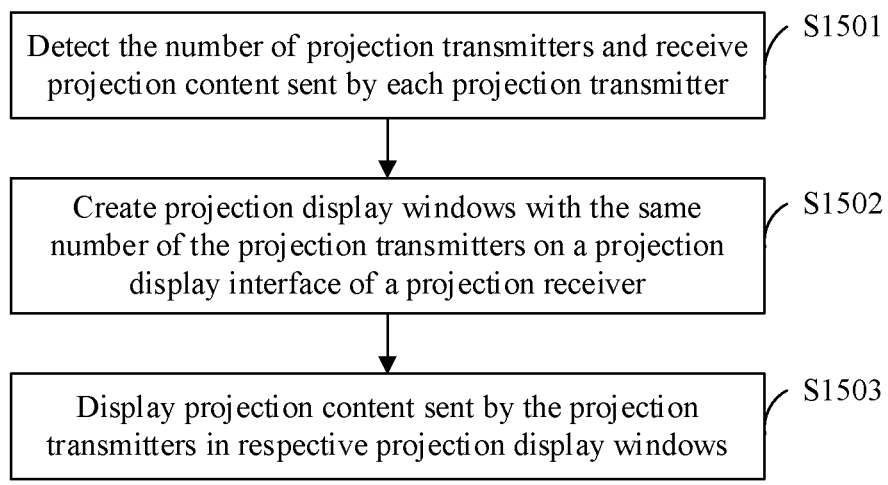
FIG. 15 is a schematic flowchart illustrating a method for displaying multiple windows according to an embodiment of the present disclosure.

In a possible embodiment of the present disclosure, as shown in FIG. 15, the projection content sent by the projection transmitter is received and the projection content is displayed on the projection display interface of the projection receiver by the following steps S1501 to S1503.

In step S1501, the number of projection transmitters is detected, and projection content sent by each projection transmitter is received.

In step S1502, projection display windows with the same number of the projection transmitters are created on a projection display interface of a projection receiver.

In step S1503, the projection content sent by the projection transmitters are displayed in respective projection display windows.

In the embodiment of the present disclosure, the projection receiver refers to a terminal for displaying the projection content, for example, a display device such as a liquid crystal display, an electronic ink screen, and a projector. The projection transmitter refers to a terminal for sending the projection content to the projection receiver, for example, electronic devices such as a computer, a mobile phone, and a tablet computer. The projection receiver is connected in communication with the projection transmitter by wired or wireless communication. As shown in FIG. 6, a projection receiver 601 is connected in communication with multiple projection transmitters 602. When being connected in communication with the projection receiver, the projection transmitter sends the projection content to the projection receiver. The projection receiver displays the projection content.

In the embodiment of the present disclosure, the number of projection transmitters connected to the projection receiver is acquired. Projection display windows matching the number of projection transmitters are created on the display interface of the projection receiver. Multiple projection display windows display multiple projection contents at the same time, which is suitable for scenarios of multi-terminal screen mirroring. The multiple projection display windows display the projection content sent by the multiple projection transmitters, so as to improve user experience.

In the embodiment of the present disclosure, when being connected to the projection transmitter, the projection receiver acquires the number of projection transmitters, receives the projection content sent by each projection transmitter, creates projection display windows matching the number of the projection transmitters on the display interface, and displays the projection content sent by the projection transmitters in the projection display windows.

In the embodiment of the present disclosure, a specific example is described for the convenience of description. A user performs remote screen mirroring by using a computer. The projection transmitter is the computer, and the projection receiver is a display device capable of communication, for example, a projector. The user on the computer side mirrors a video to the projector via the computer, and the projector displays the video. During the display, when being connected to a computer, the projector acquires the number of computers. For example, two computers are connected to the projector, and the projector receives the projection content such as video sent by the two computers, and creates two projection display windows on the display interface of the projector.

In the embodiment of the present disclosure, the number of projection transmitters connected to the projection receiver is acquired. Projection display windows that matches the number of projection transmitters are created on the display interface of the projection receiver. The multiple projection display windows simultaneously display multiple screen contents respectively, which is suitable for the scenario of multi-terminal screen mirroring. The projection content sent by the multiple projection transmitters are displayed in the multiple projection display windows respectively, so as to improve user experience.

Figure 16:
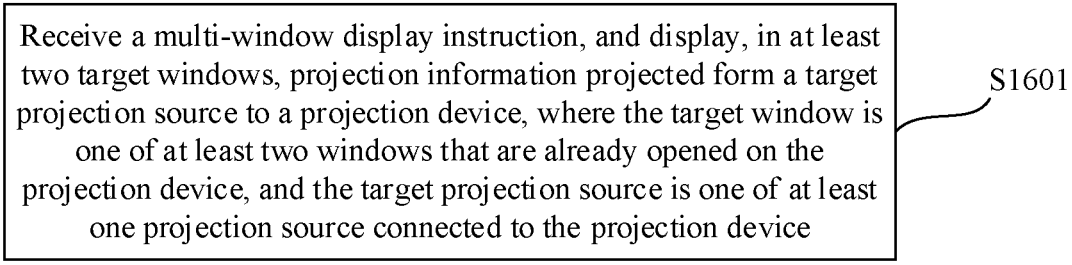
FIG. 16 is a schematic flowchart illustrating a method for screen mirroring according to another embodiment of the present disclosure.

A method for screen mirroring is provided according to another embodiment of the present disclosure. FIG. 16 shows a schematic flowchart of the method. The method includes the following step S1601.

In S1601, a multi-window display instruction is received, and projection information mirrored form a target projection source to a projection device is displayed in at least two target windows. The target window is one of at least two windows that are already opened on the projection device. The target projection source is one of at least one projection source connected to the projection device. According to the embodiment of the present disclosure, the projection information includes media information of various types, real-time operation images, and the like.

In the embodiment of the present disclosure, the multi-window display instruction instructs to display the projection information mirrored by the same projection source to the projection device in at least two windows simultaneously. For example, three windows are opened on the projection device at the same time, and the projection device is connected to one projection source. The multi-window display instruction instructs the three windows to display the projection information mirrored by the projection source to the projection device. That is, the three windows all display the same projection information.

In the embodiment of the present disclosure, in step S1601, the projection information mirrored form the target projection source to the projection device is displayed in at least two target windows as follows. In a case that a first number is greater than a second number, the projection information mirrored by the target projection source to the projection device is displayed in at least two target windows.

The first number is the number of opened windows indicated by the window opening instruction. The second number is the number of projection sources to which the projection device indicated by the connection instruction is connected.

For example, the projection device is connected to two projection sources, and thus the second number is 2. The two projection sources are projection sources A and B. Three windows are opened on the projection device, namely, windows A, B and C, and thus the first number is 3. The projection information mirrored by the projection source A to the projection device is displayed in the window A. The projection information mirrored by the projection source A or B to the projection device is displayed in the window B. The projection information mirrored by the projection source B to the projection device is displayed in the window C.

In the embodiment of the present disclosure, the first number may be the number of all windows on the projection device, and the second number may be 1.

In the embodiment of the present disclosure, in response to the connection instruction, the projection device is connected to one projection source, that is, the second number is 1. In response to the window opening instruction, three windows on the projection device are opened, that is, the first number is 3. In response to a multi-window display instruction, the projection information mirrored by the projection source to the projection device is displayed on the three opened windows.

In the embodiment of the present disclosure, the projection device is connected to one projection source, and all the three windows display the same projection information mirrored by the projection source. For example, there is a rectangular LED screen of more than 100 inches in a conference room, and three windows are displayed side by side on the left, middle, and right positions of the LED screen. The three windows simultaneously display the same projection information mirrored by the same projection source. In this way, participants from various viewing angles in the conference room can see the same projection information.

In the embodiment of the present disclosure, a disconnection instruction is received. If the disconnection instruction instructs the projection device to be disconnected from the target projection source and the target projection source is the only projection source connected to the projection device, all windows on the projection device are to be closed.

For example, there are three windows in total on the projection device, and all the three windows are opened. When the only projection source connected to the projection device is actively or passively disconnected from the projection device, the three windows are automatically closed. The label of the projection source is grayed out, indicating that the projection source is off.

In the embodiment of the present disclosure, a multi-window display instruction is received. The projection information mirrored by the target projection source to the projection device is displayed in at least two target windows. The target window is one of at least two windows that have been opened on the projection device. The target projection source is one of at least one projection source connected to the projection device. In this way, multiple windows are opened on the same projection device and display the projection information mirrored by the same projection source to the projection device, so that users from various viewing angles can see the same projection information, thereby improving the user experience.

Figure 17:
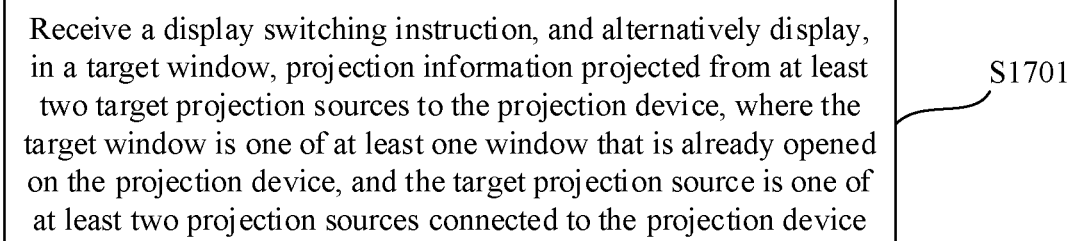
FIG. 17 is a schematic flowchart illustrating a method for screen mirroring according to another embodiment of the present disclosure.

A method for screen mirroring is provided according to another embodiment of the present disclosure. FIG. 17 shows a schematic flowchart of the method. The method includes the following step S1701.

In S1701, a display switching instruction is received, and projection information mirrored by one of at least two target projection sources to the projection device and projection information mirrored by another of the at least two target projection sources to the projection device are alternatively displayed in the target window. The target window is one of at least one window that is already opened on the projection device. The target projection source is one of at least two projection sources connected to the projection device.

In the embodiment of the present disclosure, the display switching instruction instructs the same window to switch from projection information A to projection information B. The projection information A is mirrored by a projection source to the projection device. The projection information B is mirrored by another projection source to the projection device.

For example, one window on the projection device is opened. The projection device is connected to a projection source 1, a projection source 2, and a projection source 3. The labels of the three projection sources in the window on the projection device are Device 1, Device 2, and Device 3, respectively. The window is displaying projection information A. The projection information A is mirrored by the projection source 1 corresponding to Device 1 to the projection device. When the user clicks on Device 2, the display switching instruction is triggered. The display switching instruction instructs the window to switch from the projection information A to projection information B. The projection information B is mirrored by the projection source 2 corresponding to Device 2 to the projection device. When the user clicks on Device 3, the display switching instruction is triggered again. The display switching instruction instructs the window to switch from the projection information B to projection information C. The projection information C is mirrored by the projection source 3 corresponding to Device 3 to the projection device.

In the embodiment of the present disclosure, in step S1701, the projection information mirrored by one of at least two target projection sources to the projection device and projection information mirrored by another of the at least two target projection sources to the projection device are alternatively displayed in the target window as follows. In a case of at least two different target windows, the two target windows synchronously or asynchronously switch between the projection information mirrored by the at least two target projection sources to the projection device.

In the embodiment of the present disclosure, three projection sources are wirelessly connected to the projection device. Three windows are opened on the projection device. Each window may switch among projection information mirrored by the three projection sources to the projection device. The three windows may display the projection information mirrored by the same projection source to the projection device. Alternatively, the three windows respectively display the projection information mirrored by the three projection sources to the projection device.

In the embodiment of the present disclosure, the same window switches between projection sources. For example, only one of three windows is opened. There are three projection sources are wirelessly mirroring contents to the projection device. None of the three projection sources is to be disconnected from the projection device. In this case, the opened window may switch between projection information mirrored by the three projection sources to the projection device. Each of the three windows may correspond to labels of all the three projection sources, so that the window, when being opened, can switch among the three projection sources.

In the embodiment of the present disclosure, a window closing instruction is received. In a case that the window closing instruction instructs to close at least one opened window rather than all opened windows, the connection between the projection device and each connected projection source remains unchanged. In a case that the window closing instruction instructs to close all opened windows, the projection device is disconnected from all connected projection sources. The opened window is a window that has been opened in response to the window opening instruction. The connected projection source is a projection source that has been connected to the projection device in response to the connection instruction.

In the embodiment of the present disclosure, in a case that the connection instruction instructs the projection device to connect to multiple projection sources and the window opening instruction instructs to open a window A on the projection device, projection information mirrored by one of the multiple projection sources to the projection device is displayed in the window A. After the projection source B among the multiple projection sources is disconnected from the projection device, one of the multiple projection sources except for the projection source B is displayed in the A window. Alternatively, the projection source C that is last connected to the projection device among the multiple projection sources except for the projection source B is displayed in the window A. Therefore, after the projection source B is disconnected from the videocasting device, the same window can flexibly switch among other projection sources.

In the embodiment of the present disclosure, three projection sources are wirelessly connected to the projection device. Three windows are opened on the projection device. The projection device receives the window closing instruction. The window closing instruction instructs the projection device to close one or two of the three windows. In this case, none of the three projection sources is disconnected from the projection device. In response to all the three windows being closed, all the three projection sources are disconnected from the projection device.

In the embodiment of the present disclosure, three projection sources A, B, and C are connected to the projection device. Three windows are opened on the projection device. The projection device receives the window closing instruction which instructs to close two of the three windows. In this case, only one window is opened on the projection device to display content mirrored by the projection source A to the projection device. After the projection source A is actively disconnected from the projection device, the current window automatically switches to content mirrored by one of the projection source B and the projection source C to the projection device rather than is closed. The one of the projection source B and the projection source C is last connected to the projection device among the three projection sources A, B, and C.

In an embodiment of the present disclosure, two or three projection sources are connected to the projection device and only one window is opened on the projection device. The projection device receives the window closing instruction. The window closing instruction instructs the projection device to close the window. Before closing the window, a dialog box pops up showing "Close the application will disconnect all connections. To disconnect the current connection, please click the return button. To disconnect all connections? OK/Return".

In the embodiment of the present disclosure, a display switching instruction is received. The target window switches between projection information mirrored by one of at least two target projection sources to the projection device and projection information mirrored by another of the at least two target projection sources to the projection device. The target window is one of at least one window that has been opened on the projection device. The target projection source is one of at least two projection sources connected to the projection device. In this way, the same window switches between different projection sources, so that the user can view projection information mirrored by different projection sources to the projection device through the same window, thereby improving the user experience.

Figure 18:
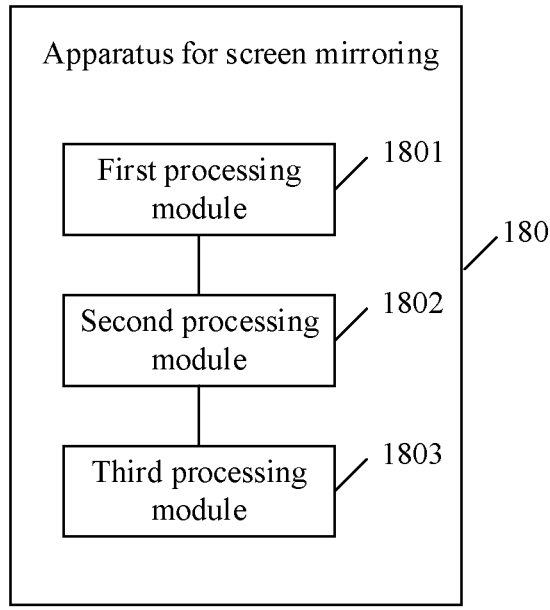
FIG. 18 is a schematic structural diagram illustrating an apparatus for screen mirroring according to an embodiment of the present disclosure.

Based on the same inventive concept, an apparatus for screen mirroring is also provided according to an embodiment of the present disclosure. FIG. 18 is a schematic structural diagram illustrating this apparatus. The apparatus 180 for screen mirroring includes a first processing module 1801, a second processing module 1802 and a third processing module 1803.

The first processing module 1801 is configured to acquire a disconnection instruction.

The second processing module 1802 is configured to disconnect at least one first target projection source from a projection device in response to the disconnection instruction, and determine a second connection number. The second connection number is the number of first target projection sources that are still connected to the projection device.

The third processing module 1803 is configured to display, based on the second connection number and a first window number, projection information mirrored to the projection device from the first target projection sources that are still connected to the projection device. The first window number is the number of target windows that are already opened on the projection device.

In the embodiment of the present disclosure, the third processing module 1803 is configured to: close target windows of the second window number in a case that a second connection number is less than the first window number, where the second window number is less than the first window number; and display projection information mirrored from the first target projection sources that are still connected to the projection device in target windows that are not closed. Alternatively, the third processing module 1803 is configured to remain the first window number of target windows open in a case that the second connection number is greater than or equal to the first window number; and display projection information mirrored from the first target projection sources that are still connected to the projection device in the first window number of the target windows.

In the embodiment of the present disclosure, the third processing module 1803 is configured to display projection information mirrored to the projection device by the first target projection sources of a third connection number that are still connected to the projection device in the first window number of target windows. The third connection number is less than or equal to the first window number. The third connection number of the first target projection sources is determined based on a time sequence of connections between the first target projection sources and the projection device.

In the embodiment of the present disclosure, the third processing module 1803 is configured to display projection information mirrored to the projection device by different first target projection sources or the same first target projection source among the third connection number of the first target projection sources.

In the embodiment of the present disclosure, the second processing module 1802 is configured to disconnect a first target projection source from the projection device. Before the first target projection source is disconnected from the projection device, the projection information mirrored by the first target projection source to the projection device is displayed in target windows of the first connection number. The first connection number is the number of first target projection sources connected to the projection device before the disconnection. Correspondingly, the second processing module 1802 is configured to switch between projection information mirrored by one of the first target projection sources that are still connected to the projection device to the projection device and projection information mirrored by another of the first target projection sources that are still connected to the projection device to the projection device.

In the embodiment of the present disclosure, after disconnecting the first target projection source from the projection device, the second processing module 1802 is further configured to close at least one target window that was opened last.

In the embodiment of the present disclosure, the third processing module 1803 is further configured to disconnect all the first target projection sources from the projection device when it is detected that all the target windows are disconnected.

In the embodiment of the present disclosure, the first connection number is greater than or equal to 2. The first window number is greater than or equal to 1. The first connection number is the number of first target projection sources connected to the projection device before the disconnection.

The application of the embodiments of the present disclosure has at least the following beneficial effects. At least one first target projection source is disconnected from a projection device. A second connection number is determined. The second connection number is the number of first target projection sources that are still connected to the projection device. Projection information mirrored from the first target projection sources that are still connected to the projection device is displayed based on the second connection number and a first window number. The first window number is the number of target windows that are already opened on the projection device. Therefore, it is ensured that the projection information mirrored from the first target projection sources that are still connected to the projection device is displayed in target windows in appropriate number, thereby saving window resources and improving user experience.

Figure 19:
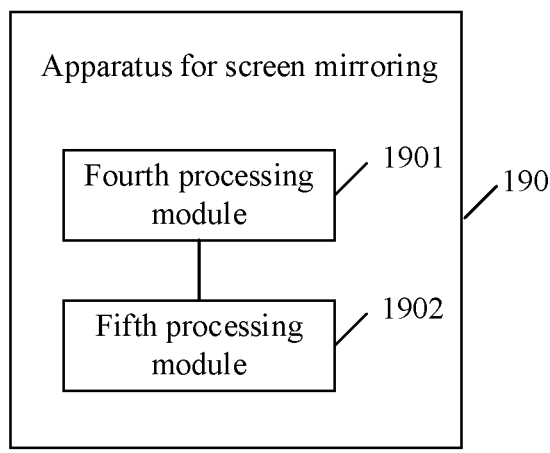
FIG. 19 is a schematic structural diagram illustrating an apparatus for screen mirroring according to another embodiment of the present disclosure.

Based on the same inventive concept, an apparatus for screen mirroring is also provided according to another embodiment of the present disclosure. FIG. 19 is a schematic structural diagram illustrating this apparatus. The apparatus 190 includes a fourth processing module 1901 and a fifth processing module 1902.

The fourth processing module 1901 is configured to acquire a first connection instruction and a window opening instruction. The first connection instruction is for instructing to connect a projection device to a projection source. The window opening instruction is for instructing to open a window on the projection device.

The fifth processing module 1902 is configured to receive a window display instruction, and display projection information mirrored from first target projection sources to the projection device in target windows. The target windows are included in windows indicated by the window display instruction among windows opened on the instruction of the window opening instruction. The first target projection sources include the projection source connected to the projection device on the instruction of the first connection instruction.

In the embodiment of the present disclosure, the fifth processing module 1902 is further configured to determine a first connection number and a first window number, where the first connection number is the number of the first target projection sources connected to the projection device, and the first window number is the number of target windows that have been opened on the projection device; and display, based on the first connection number and the first window number, projection information mirrored by a second target projection source to the projection device. The second target projection source is a projection source other than each of the first target projection sources.

In the embodiment of the present disclosure, the fifth processing module 1902 is further configured to display the projection information mirrored by the second target projection source to the projection device in at least one of the two target windows displaying the projection information mirrored by the same first target projection source in a case that the first connection number is less than a first preset threshold and the first window number is equal to a second preset threshold. Alternatively, the fifth processing module 1902 is further configured to display, in response to the received disconnection instruction, the projection information mirrored by the second target projection source to the projection device in at least one of the target windows in a case that the first connection number is equal to the first preset threshold. The disconnection instruction is for instructing to disconnect at least one of the first target projection sources from the projection device. The first preset threshold represents the maximum number of projection sources that the projection device can connects to. The second preset threshold represents the maximum number of windows can be opened on the projection device.

The fifth processing module 1902 is further configured to determine, in response to the received disconnection instruction, the target window as a display window for the second target projection source newly connected to the projection device, and display the projection information mirrored by the second target projection source to the projection device. The disconnection instruction instructs to disconnect the first target projection source from the projection device. The projection information mirrored by the first target projection source to the projection device is displayed in the display window.

The fifth processing module 1902 is further configured to determine, in response to the received disconnection instruction, at least one target window based on at least one of a target window having a focus among the target windows, a prompt of each of the target windows, and a preset selection box; and display the projection information mirrored by the second target projection source to the projection device in the at least one target window.

The application of the embodiments of the present disclosure has at least the following beneficial effects. In a case that the screen mirroring service of the projection device is disenabled, the projection source fails to mirror content to the projection device forcedly, which avoids screen mirroring performed by mistake, thereby saving window resources and improving user experience.

For details not described in the apparatus for screen mirroring according to the embodiment of the present disclosure, reference may be made to the method for screen mirroring according to the above embodiments. The beneficial effects that can be achieved by the apparatus for screen mirroring according to the embodiment of the present disclosure are the same as those of the method for screen mirroring according to the above embodiments, and thus are not repeated here.

Figure 20:
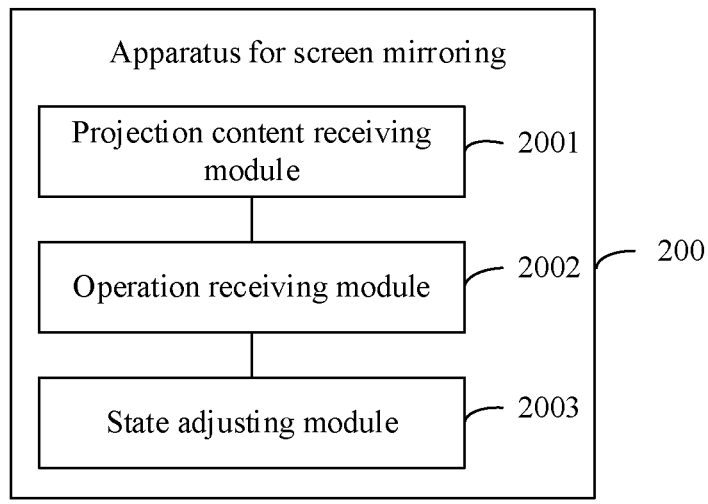
FIG. 20 is a schematic structural diagram illustrating an apparatus for screen mirroring according to another embodiment of the present disclosure.

An apparatus for screen mirroring is also provided according to another embodiment of the present disclosure. As shown in FIG. 20, the apparatus 200 includes a projection content receiving module 2001, an operation receiving module 2002 and a state adjusting module 2003.

The projection content receiving module 2001 is configured to receive projection content sent by a projection transmitter and display the received projection content on a projection display interface of a projection receiver. The projection display interface is provided with a display state adjustment area.

The operation receiving module 2002 is configured to receive a display state adjustment operation performed by a user based on the display state adjustment area.

The state adjustment module 2003 is configured to adjust a display state of the projection display interface based on the display state adjustment operation.

Optionally, the display state adjustment area is provided with a resolution adjustment area. The display state adjustment operation includes a resolution adjustment operation. In order to adjust the display state of the projection display interface based on the display state adjustment operation, the state adjustment module 2003 is configured to adjust display resolution of the projection display interface based on the resolution adjustment operation.

Optionally, in order to adjust the display resolution of the projection display interface based on the resolution adjustment operation, the state adjustment module 2003 is configured to: receive a resolution adjustment operation performed by the user based on the resolution adjustment area; send a resolution adjustment request to the projection transmitter based on the resolution adjustment operation, where the resolution adjustment request includes target resolution; and receive projection content sent by the projection transmitter based on the resolution adjustment request. The resolution of the projection content is the target resolution.

Optionally, the projection display interface is provided with a transmitter display control. The apparatus 200 is configured to: detect a transmitter that is sending the projection content being displayed on the projection display interface; and display, via the transmitter display control, identification information of the transmitter that is sending the projection content being displayed.

Optionally, the projection display interface is provided with one or more projection display windows. Each projection display window is provided with a state display control. The apparatus 200 is configured to: monitor display states of the one or more projection display windows; and display a display state of a projection display window in the state display control corresponding to the projection display window.

Optionally, the display state of the projection display window includes a first state, a second state or a third state. The first state indicates that the current window displays no projection content. The second state indicates that the current window is selected for displaying projection content. The third state indicates that the current window is displaying projection content.

Optionally, the projection display interface is provided with a projection display window. The display state adjustment area is provided with a projection content switching area. The display state adjustment operation includes a projection content switching operation. In order to adjust the display state of the projection display interface based on the display state adjustment operation, the state adjustment module 2003 is configured to: switch projection content displayed in the projection display window based on the projection content adjustment operation; or adjust one or more projection display windows based on the projection content adjustment operation, to display projection content sent by the same projection transmitter.

Optionally, the projection display interface is provided with a projection display window, and the apparatus 200 is further configured to: update, when it is detected that the number of projection transmitters changes, the number of projection display windows to match the changed number of projection transmitters.

Optionally, the projection display interface is provided with a projection display window. The apparatus 200 is further configured to: determine a type of projection content sent by each projection transmitter, and adjust a display mode of a projection display window corresponding to the projection transmitter based on the type of projection content.

Optionally, the display state adjustment area is provided with a display mode adjustment area. The display state adjustment operation includes a display mode adjustment operation. In order to adjust the display state of the projection display interface based on the display state adjustment operation, the state adjustment module 2003 is configured to adjust a display mode of the display interface based on the display mode adjustment operation.

Optionally, the projection display interface is provided with one or more projection display windows. The apparatus 200 is further configured to: detect projection display content displayed in the one or more projection display windows; and adjust display modes of the one or more projection display windows based on the projection content displayed in respective projection display windows.

Optionally, the projection display interface is provided with one or more projection display windows. Each projection display window is provided with one or more display parameter adjustment areas.

Optionally, the apparatus 200 is further configured to: adjust the display mode of the projection display interface based on the projection content sent by the projection transmitter.

Optionally, in order to receive the projection content sent by the projection transmitter and display the projection content on the projection display interface of the projection receiver, the apparatus 200 is further configured to: detect the number of projection transmitters, and receive projection content sent by each of the projection transmitters; create, on the projection display interface of the projection receiver, projection display windows with the same number of the projection transmitters; and display the projection content sent by the projection transmitters in respective projection display windows.

The apparatus for screen mirroring according to this embodiment may perform the method for screen mirroring shown in the foregoing embodiments of the present disclosure, and is implemented similarly with the method for screen mirroring, and thus is not described in detail herein.

In the embodiment of the present disclosure, the number of projection transmitters connected to the projection receiver is acquired. Projection display windows matching the number of projection transmitters are created on the display interface of the projection receiver. Multiple projection display windows display multiple projection contents at the same time, which is suitable for scenarios of multi-terminal screen mirroring. The multiple projection display windows display the projection content sent by the multiple projection transmitters, and display effect of the displayed content can be adjusted in each projection display window, so as to improve user experience.

Figure 21:
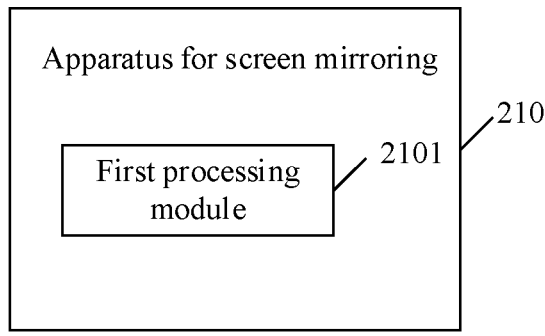
FIG. 21 is a schematic structural diagram illustrating an apparatus for screen mirroring according to another embodiment of the present disclosure.

Based on the same inventive concept, an apparatus for screen mirroring is also provided according to another embodiment of the present disclosure. FIG. 21 is a schematic structural diagram illustrating this apparatus. The apparatus 210 includes a first processing module 2101.

The first processing module 2101 is configured to receive a multi-window display instruction, and display, in at least two target windows, projection information mirrored form a target projection source to a projection device. The target window is one of at least two windows that are already opened on the projection device. The target projection source is one of at least one projection source connected to the projection device.

In the embodiment of the present disclosure, the first processing module 2101 is further configured to acquire a connection instruction and a window opening instruction. The connection instruction instructs the projection device to connect to a projection source. The window opening instruction instructs to open a window on the projection device.

In the embodiment of the present disclosure, the first processing module 2101 is configured to display, in the at least two target windows, the projection information mirrored by the target projection source to the projection device in a case that a first number is greater than a second number. The first number is the number of windows opened on the instruction of the window opening instruction. The second number is the number of projection sources connected to the projection device on the instruction of the connection instruction.

In the embodiment of the present disclosure, the first number is the number of all windows on the projection device, and the second number is 1.

In the embodiment of the present disclosure, the first processing module 2101 is further configured to acquire a disconnection instruction. The first processing module 2101 is further configured to close all windows on the projection device in a case that the disconnection instruction instructs the projection device to be disconnected from the target projection source and the target projection source is the only one projection source connected to the projection device.

The application of the embodiments of the present disclosure has at least the following beneficial effects. The multi-window display instruction is received. The projection information mirrored by the target projection source to the projection device is displayed in at least two target windows. The target window is one of at least two windows that have been opened on the projection device. The target projection source is one of at least one projection source connected to the projection device. In this way, multiple windows are opened on the same projection device and display the projection information mirrored by the same projection source to the projection device, so that users from various viewing angles can see the same projection information, thereby improving the user experience.

Figure 22:
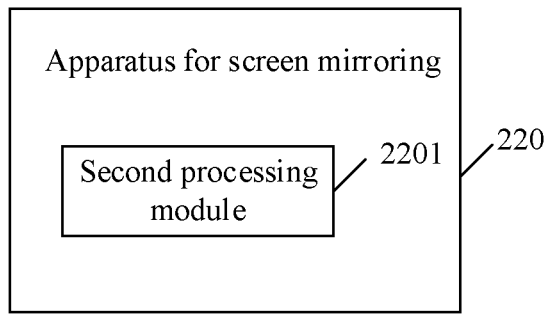
FIG. 22 is a schematic structural diagram illustrating an apparatus for screen mirroring according to another embodiment of the present disclosure.
Figure 23:
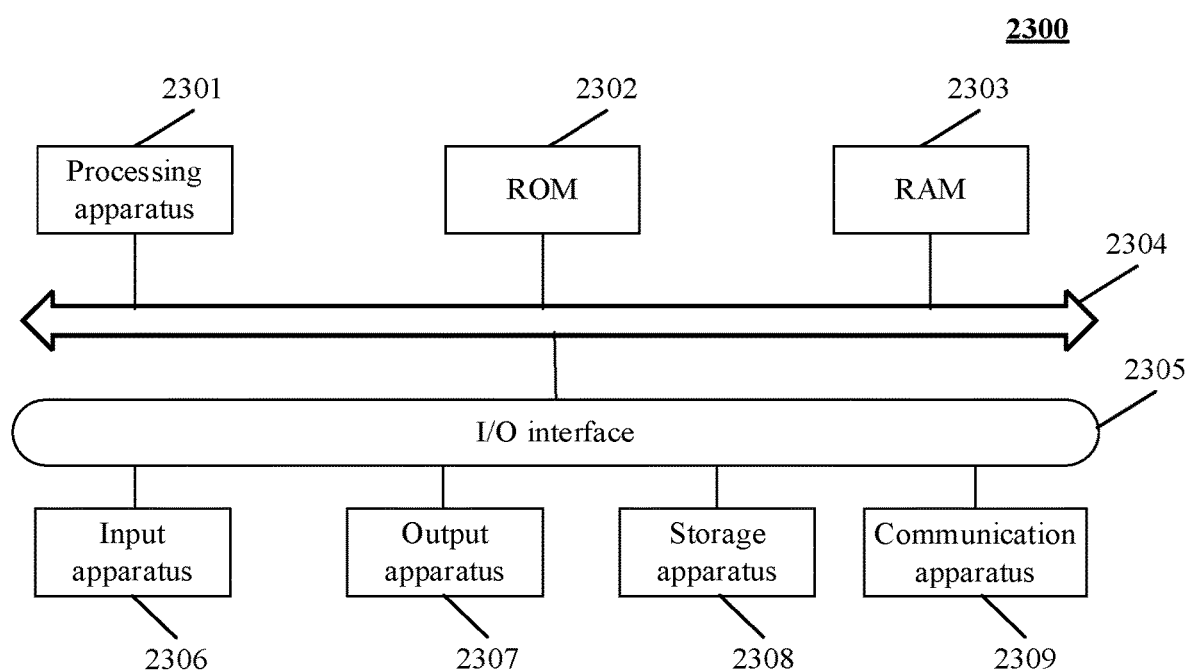
FIG. 23 is a schematic structural diagram illustrating an electronic device according to an embodiment of the present disclosure.

Based on the same inventive concept, an apparatus for screen mirroring is also provided according to another embodiment of the present disclosure. FIG. 22 is a schematic structural diagram illustrating this apparatus. The apparatus 220 includes a second processing module 2201.

The second processing module 2201 is configured to receive a display switching instruction and alternatively display, in a target window, projection information mirrored by one of at least two target projection sources to the projection device and projection information mirrored by another of the at least two target projection sources to the projection device. The target window is one of at least one window that is already opened on the projection device. The target projection source is one of at least two projection sources connected to the projection device.

In the embodiment of the present disclosure, the second processing module 2201 is configured to acquire a connection instruction and a window opening instruction. The connection instruction instructs the projection device to connect to the projection source. The window opening instruction instructs to open a window on the projection device.

In the embodiment of the present disclosure, the second processing module 2201 is configured to synchronously or asynchronously switch, in a case of at least two different target windows, projection information mirrored by the at least two target projection sources to the projection device in the at least two different target windows.

In the embodiment of the present disclosure, the second processing module 2201 is further configured to receive a window closing instruction. The second processing module 2201 is further configured to remain, in a case that the window closing instruction instructs to close at least one opened window rather than all opened windows, the connection between the projection device and each connected projection source unchanged. The second processing module 2201 is further configured to disconnect the projection device from all connected projection sources in a case that the window closing instruction instructs to close all opened windows. The opened window is a window that has been opened in response to the window opening instruction. The connected projection source is a projection source that has been connected to the projection device in response to the connection instruction.

The application of the embodiments of the present disclosure has at least the following beneficial effects. The display switching instruction is received. The target window switches between projection information mirrored by one of at least two target projection sources to the projection device and projection information mirrored by another of the at least two target projection sources to the projection device. The target window is one of at least one window that has been opened on the projection device. The target projection source is one of at least two projection sources connected to the projection device. In this way, the same window switches between different projection sources, so that the user can view projection information mirrored by different projection sources to the projection device through the same window, thereby improving the user experience.

For details not described in the apparatus for screen mirroring according to the embodiment of the present disclosure, reference may be made to the method for screen mirroring according to the above embodiments. The beneficial effects that can be achieved by the apparatus for screen mirroring according to the embodiment of the present disclosure are the same as those of the method for screen mirroring according to the above embodiments, and thus are not repeated here.

Reference is made to FIG. 7 below, which is a schematic structural diagram illustrating an electronic device 800 for implementing the method according to the embodiment of the present disclosure. The terminal device in the embodiments of the present disclosure may include but is not limited to mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), and stationary terminals such as digital TVs, and desktop computers. The electronic device shown in FIG. 7 is only an example, and should not impose any limitation on the functionalities and scope of use of the embodiments of the present disclosure.

The electronic device includes a memory and a processor. The processor here may be referred to as the processing apparatus 801 described below. The memory may include at least one of a read only memory (ROM) 802, a random-access memory (RAM) 803, and a storage apparatus 808 hereinafter, as shown in FIG. 7.

The electronic device 800 may include a processing apparatus (e.g., a central processing unit or a graphics processing unit) 801. The processing apparatus 801 may perform various appropriate actions and processing according to a program stored in the read only memory (ROM) 802 or a program loaded from a storage apparatus 808 into the random-access memory (RAM) 803. Various programs and data necessary for the operation of the electronic device 800 are also stored in the RAM 803. The processing apparatus 801, the ROM 802, and the RAM 803 are connected to each other via a bus 804. An input/output (I/O) interface 805 is also connected to the bus 804.

Generally, the following components may be connected to the I/O interface 805: an input apparatus 806 including, for example, a touch screen, a touch pad, a keyboard, a mouse, a camera, a microphone, an accelerometer, and a gyroscope; an output apparatus 807 including, for example, a liquid crystal display (LCD), a speaker and a vibrator; a storage apparatus 808 including, for example, a tape and a hard disk; and a communication apparatus 809. The communication apparatus 809 may allow the electronic device 800 to communicate wirelessly or by wire with other devices to exchange data. Although FIG. 7 shows the electronic device 800 having various apparatuses, it should be understood that not all of the illustrated apparatuses are necessarily implemented or provided. Instead, more or fewer apparatuses may be implemented or provided.

In particular, the processing described above with reference to the flowcharts may be implemented as computer software programs according to an embodiment of the present disclosure. For example, a computer program product is provided according to an embodiment of the present disclosure. The computer program product includes a computer program carried by a non-transitory computer readable medium. The computer program includes program code for performing the method shown in the flowchart. In such embodiment, the computer program may be downloaded and installed from the network via the communication apparatus 809, or from the storage apparatus 808, or from the ROM 802. The computer program, when being executed by the processing apparatus 801, implements the functionalities defined in the method according to the embodiment of the present disclosure.

It should be noted that the computer readable medium according to the present disclosure may be a computer readable signal medium or a computer readable storage medium, or any combination of the above two. The computer readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connections with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. According to the present disclosure, the computer readable storage medium may be any tangible medium that contains or stores a program. The program may be used by or in conjunction with an instruction execution system, apparatus or device. In the present disclosure, the computer readable signal medium may include a data signal propagated in baseband or as part of a carrier wave with computer readable program code embodied thereon. The data signal propagated in this manner may be in various forms, including but not limited to an electromagnetic signal, an optical signal, or any suitable combination of the foregoing. The computer readable signal medium may also be any computer readable medium other than the computer readable storage medium. The computer readable signal medium may transmit, propagate, or transport the program for use by or in connection with the instruction execution system, apparatus, or device. The program code embodied on the computer readable medium may be transmitted over any suitable medium including, but not limited to, an electrical wire, an optical fiber cable, RF (radio frequency), or any suitable combination of the foregoing.

In some embodiments, the client terminal and the server may perform communications based on any currently known or future developed network protocol such as HTTP (Hypertext Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., the ad hoc peer-to-peer network), as well as any currently known or future developed networks.

The computer readable medium may be included in the electronic device, or may exist alone without being incorporated into the electronic device.

The computer readable medium carries one or more programs that, when being executed by the electronic device, cause the electronic device to: acquire a disconnection instruction; in response to the disconnection instruction, disconnect at least one first target projection source from a projection device, and determine a second connection number, where the second connection number is the number of first target projection sources that are still connected to the projection device; and display projection information mirrored to the projection device from the first target projection sources that are still connected to the projection device based on the second connection number and a first window number, where the first window number is the number of target windows that are already opened on the projection device.

The computer readable medium carries one or more programs that, when being executed by the electronic device, cause the electronic device to: acquire a first connection instruction and a window opening instruction, where the first connection instruction is for instructing to connect a projection device to a projection source, and the window opening instruction is for instructing to open a window on the projection device; and receive a window display instruction, and display, in target windows, projection information mirrored from first target projection sources to the projection device, where the target windows are included in windows indicated by the window display instruction among windows opened on the instruction of the window opening instruction, and the first target projection sources include the projection source connected to the projection device on the instruction of the first connection instruction.

The computer readable medium carries one or more programs that, when being executed by the electronic device, cause the electronic device to: acquire the number of projection transmitters connected to a projection receiver, and receive projection content sent by each projection transmitter; create multiple projection display windows on a projection display interface based on the number of projection transmitters; and display the projection content sent by the projection transmitters in the multiple projection display windows.

The computer readable medium carries one or more programs that, when being executed by the electronic device, cause the electronic device to: receive a multi-window display instruction, and display, in at least two target windows, projection information mirrored form a target projection source to a projection device. The target window is one of at least two windows that are already opened on the projection device, and the target projection source is one of at least one projection source connected to the projection device.

The computer readable medium carries one or more programs that, when being executed by the electronic device, cause the electronic device to: receive a display switching instruction, and alternatively display, in a target window, projection information mirrored from at least two target projection sources to the projection device. The target window is one of at least one window that is already opened on the projection device. The target projection source is one of at least two projection sources connected to the projection device.

The computer program code for performing operations according to the present disclosure may be written in one or more programming languages, or a combination thereof. Such programming languages include, but are not limited to, object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to a user computer over any kind of network, including a local area network (LAN) or a wide area network (WAN), or may be connected to an external computer (e.g., over the Internet provided by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code. The module, segment, or portion of code contains one or more executable instructions for implementing the specified logical functionalities. It should be noted that, in some alternative implementations, the functionalities noted in the blocks may be performed in an order different from the order noted in the drawings. For example, two blocks shown in succession may in fact be performed concurrently or in reverse, depending upon the functionalities involved. It should further be noted that each block in the block diagrams and/or flowcharts and combinations of blocks in the block diagrams and/or flowcharts may be implemented by special purpose hardware-based systems that perform specified functionalities or operations, or by combinations of special purpose hardware and computer instructions.

The modules or units involved in the embodiments of the present disclosure may be implemented in software or hardware. The name of a module or unit does not, in any case, qualify the module or unit itself.

The functionalities described herein above may be performed, at least in part, by one or more hardware logic components. For example, without limitation, illustrative hardware logic components that may be used include: Field Programmable Gate Array (FPGA), Application Specific Integrated Circuit (ASIC), Application Specific Standard Products (ASSP), Systems on Chip (SOC), Complex Programmable Logic Device (CPLD) and so on.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. More specific examples of the machine-readable storage medium may include: an electrical connection based on one or more wires, a portable computer disk, a hard disk, a random-access memory (RAM), a read only memory (ROM), an erasable programmable read only memory (EPROM or flash memory), a fiber optic cable, a portable compact disk read only memory (CD-ROM), an optical storage device, a magnetic storage device, or any suitable combination of the foregoing.

A method for screen mirroring is provided according to one or more embodiments of the present disclosure. The method includes:
  acquiring a disconnection instruction;
  in response to the disconnection instruction, disconnecting at least one first target projection source from a projection device, and determining a second connection number, where the second connection number is the number of first target projection sources that are still connected to the projection device; and
  displaying, based on the second connection number and a first window number, projection information mirrored to the projection device from the first target projection sources that are still connected to the projection device, where the first window number is the number of target windows that are already opened on the projection device.

In the embodiments of the present disclosure, the displaying, based on the second connection number and a first window number, projection information mirrored to the projection device from the first target projection sources that are still connected to the projection device includes:
  in a case that the second connection number is less than the first window number, closing target windows of a second window number, where the second window number is less than the first window number; and displaying, in target windows that are not closed, the projection information mirrored to the projection device from the first target projection sources that are still connected to the projection device; or
  in a case that the second connection number is greater than or equal to the first window number, remaining the first window number of the target windows open, and displaying, in the first window number of the target windows, the projection information mirrored to the projection device from the first target projection sources that are still connected to the projection device.

In the embodiments of the present disclosure, the displaying, in the first window number of the target windows, the projection information mirrored to the projection device from the first target projection sources that are still connected to the projection device includes:
  displaying, in the first window number of target windows, the projection information mirrored to the projection device by the first target projection sources of a third connection number that are still connected to the projection device, where the third connection number is less than or equal to the first window number, and the third connection number of the first target projection sources are determined based on a time sequence of connections between the first target projection sources and the projection device.

In the embodiments of the present disclosure, the displaying, in the first window number of target windows, the projection information mirrored to the projection device by the first target projection sources of a third connection number that are still connected to the projection device includes:

displaying, in the first window number of the target windows, projection information mirrored to the projection device by different first target projection sources or the same first target projection source among the third connection number of the first target projection sources.

In the embodiments of the present disclosure, the disconnecting at least one first target projection source from a projection device includes:

disconnecting one first target projection source from the projection device, where projection information mirrored by the first target projection source to the projection device is displayed in target windows of a first connection number before the first target projection source is disconnected from the projection device, and the first connection number is the number of first target projection sources connected to the projection device before the first target projection source is disconnected from the projection device, and where the displaying projection information mirrored to the projection device from the first target projection sources that are still connected to the projection device includes:

alternatively displaying projection information mirrored to the projection device from the first target projection sources that are still connected to the projection device.

In the embodiments of the present disclosure, the method further includes: closing at least one target window that was opened last after disconnecting the first target projection source from the projection device.

In the embodiments of the present disclosure, the method further includes: disconnecting all first target projection sources connected to the projection device from the projection device when it is detected that all target windows are off.

In the embodiments of the present disclosure, the first connection number is greater than or equal to 2, the first window number is greater than or equal to 1, and the first connection number is the number of first target projection sources connected to the projection device before the disconnecting at least one first target projection source from a projection device.

A method for screen mirroring is provided according to one or more embodiments of the present disclosure. The method includes:

acquiring a first connection instruction and a window opening instruction, where the first connection instruction is for instructing to connect a projection device to a projection source, and the window opening instruction is for instructing to open a window on the projection device; and receiving a window display instruction, and displaying, in target windows, projection information mirrored from first target projection sources to the projection device, where the target windows are included in windows indicated by the window display instruction among windows opened on the instruction of the window opening instruction, and the first target projection sources include a projection source connected to the projection device on the instruction of the first connection instruction.

In the embodiments of the present disclosure, the method further includes:

determining a first connection number and a first window number, where the first connection number is the number of the first target projection sources connected to the projection device, and the first window number is the number of target windows that are already opened on the projection device;

acquiring a second connection instruction, where the second connection instruction is for instructing the projection device to connect to a second target projection source; and displaying, based on the first connection number and the first window number, projection information mirrored by the second target projection source to the projection device, where the second target projection source is a projection source other than each of the first target projection sources.

In the embodiments of the present disclosure, the displaying, based on the first connection number and the first window number, projection information mirrored by the second target projection source to the projection device includes:

displaying, in at least one of two target windows displaying projection information mirrored by a same first target projection source, the projection information mirrored by the second target projection source to the projection device, in a case that the first connection number is less than a first preset threshold and the first window number is equal to a second preset threshold; or displaying, in response to a received disconnection instruction and in at least one of the target windows, the projection information mirrored by the second target projection source to the projection device, in a case that the first connection number is equal to a first preset threshold, where the disconnection instruction is for instructing to disconnect at least one of the first target projection sources from the projection device, the first preset threshold represents a maximum number of projection sources to be connected to the projection device, and the second preset threshold represents a maximum number of windows to be opened on the projection device.

In the embodiments of the present disclosure, the displaying, in response to a received disconnection instruction and in at least one of the target windows, the projection information mirrored by the second target projection source to the projection device includes:

determining, in response to the received disconnection instruction, the target window as a display window for the second target projection source that is newly connected to the projection device, and displaying the projection information mirrored by the second target projection source to the projection device in the display window, where the disconnection instruction is for instructing to disconnect the first target projection source from the projection device, and projection information mirrored by the first target projection source to the projection device is displayed in the display window.

In the embodiments of the present disclosure, the displaying, in response to a received disconnection instruction and in at least one of the target windows, the projection information mirrored by the second target projection source to the projection device includes:

determining, in response to the received disconnection instruction, the at least one target window based on at least one of: a target window having a focus among the target windows, a prompt of each of the target windows, and a preset selection box; and displaying the projection information mirrored by the second target projection source to the projection device in the at least one target window.

An apparatus for screen mirroring is provided according to one or more embodiments of the present disclosure. The apparatus includes:
- a first processing module configured to acquire a disconnection instruction;
- a second processing module configured to disconnect at least one first target projection source from a projection device in response to the disconnection instruction, and determine a second connection number, where the second connection number is the number of first target projection sources that are still connected to the projection device; and
- a third processing module configured to display, based on the second connection number and a first window number, projection information mirrored to the projection device from the first target projection sources that are still connected to the projection device, where the first window number is the number of target windows that are already opened on the projection device.

In the embodiments of the present disclosure, the third processing module is configured to: close target windows of the second window number in a case that a second connection number is less than the first window number, where the second window number is less than the first window number; and display projection information mirrored from the first target projection sources that are still connected to the projection device in target windows that are not closed. Alternatively, the third processing module is configured to remain the first window number of target windows open in a case that the second connection number is greater than or equal to the first window number; and display projection information mirrored from the first target projection sources that are still connected to the projection device in the first window number of the target windows.

In the embodiments of the present disclosure, the third processing module is configured to display projection information mirrored to the projection device by the first target projection sources of a third connection number that are still connected to the projection device in the first window number of target windows. The third connection number is less than or equal to the first window number. The third connection number of the first target projection sources is determined based on a time sequence of connections between the first target projection sources and the projection device.

In the embodiments of the present disclosure, the third processing module is configured to display projection information mirrored to the projection device by different first target projection sources or the same first target projection source among the third connection number of the first target projection sources.

In the embodiments of the present disclosure, the second processing module is configured to disconnect a first target projection source from the projection device. Before the first target projection source is disconnected from the projection device, the projection information mirrored by the first target projection source to the projection device is displayed in target windows of the first connection number. The first connection number is the number of first target projection sources connected to the projection device before the disconnection. Correspondingly, the third processing module is configured to switch between projection information mirrored by one of the first target projection sources that are still connected to the projection device to the projection device and projection information mirrored by another of the first target projection sources that are still connected to the projection device to the projection device.

In the embodiments of the present disclosure, after the first target projection source is disconnected from the projection device, the second processing module is further configured to close at least one target window that was opened last.

In the embodiments of the present disclosure, the second processing module is further configured to disconnect all the first target projection sources connected to the projection device from the projection device when it is detected that all the target windows are disconnected.

In the embodiments of the present disclosure, the first connection number is greater than or equal to 2. The first window number is greater than or equal to 1. The first connection number is the number of first target projection sources connected to the projection device before the disconnection.

An apparatus for screen mirroring is provided according to one or more embodiments of the present disclosure. The apparatus includes:
- a fourth processing module configured to acquire a first connection instruction and a window opening instruction, where the first connection instruction is for instructing to connect a projection device to a projection source, and the window opening instruction is for instructing to open a window on the projection device; and
- a fifth processing module configured to receive a window display instruction, and display, in target windows, projection information mirrored from first target projection sources to the projection device, where the target windows are included in windows indicated by the window display instruction among windows opened on the instruction of the window opening instruction, and the first target projection sources include a projection source connected to the projection device on the instruction of the first connection instruction.

In the embodiments of the present disclosure, the fifth processing module is further configured to determine a first connection number and a first window number, where the first connection number is the number of the first target projection sources connected to the projection device, and the first window number is the number of target windows that have been opened on the projection device; and display, based on the first connection number and the first window number, projection information mirrored by a second target projection source to the projection device. The second target projection source is a projection source other than each of the first target projection sources.

In the embodiment of the present disclosure, the fifth processing module is further configured to display the projection information mirrored by the second target projection source to the projection device in at least one of the two target windows displaying the projection information mirrored by the same first target projection source in a case that the first connection number is less than a first preset threshold and the first window number is equal to a second preset threshold. Alternatively, the fifth processing module is further configured to display, in response to the received disconnection instruction, the projection information mirrored by the second target projection source to the projection device in at least one of the target windows in a case that the first connection number is equal to the first preset threshold. The disconnection instruction is for instructing to disconnect at least one of the first target projection sources from the projection device. The first preset threshold represents the maximum number of projection sources that the projection device can connects to. The second preset threshold represents the maximum number of windows can be opened on the projection device.

The fifth processing module is further configured to determine, in response to the received disconnection instruction, the target window as a display window for the second target projection source newly connected to the projection device, and display the projection information mirrored by the second target projection source to the projection device in the display window. The disconnection instruction instructs to disconnect the first target projection source from the projection device. The projection information mirrored by the first target projection source to the projection device is displayed in the display window.

The fifth processing module is further configured to determine, in response to the received disconnection instruction, at least one target window based on at least one of a target window having a focus among the target windows, a prompt of each of the target windows, and a preset selection box; and display the projection information mirrored by the second target projection source to the projection device in the at least one target window.

A method for screen mirroring is provided according to one or more embodiments of the present disclosure. The method includes:
  receiving projection content sent by a projection transmitter and displaying the received projection content on a projection display interface of a projection receiver, where the projection display interface is provided with a display state adjustment area;
  receiving a display state adjustment operation performed by a user based on the display state adjustment area; and
  adjusting a display state of the projection display interface based on the display state adjustment operation.

Further, the display state adjustment area is provided with a resolution adjustment area, and the display state adjustment operation includes a resolution adjustment operation, and where the adjusting a display state of the projection display interface based on the display state adjustment operation includes:
  adjusting display resolution of the projection display interface based on the resolution adjustment operation.

Further, the adjusting display resolution of the projection display interface based on the resolution adjustment operation includes:
  receiving the resolution adjustment operation performed by the user based on the resolution adjustment area;
  sending a resolution adjustment request to the projection transmitter based on the resolution adjustment operation, where the resolution adjustment request includes target resolution; and
  receiving projection content sent by the projection transmitter based on the resolution adjustment request, where resolution of the projection content is the target resolution.

Further, the projection display interface is provided with a transmitter display control, and the method further includes:
  detecting a transmitter that is sending projection content being displayed on the projection display interface; and
  displaying, via the transmitter display control, identification information of the transmitter that is sending the projection content being displayed.

Further, the projection display interface is provided with one or more projection display windows each provided with a state display control, and the method further includes:
  monitoring display states of the one or more projection display windows; and
  displaying the display states of the one or more projection display windows on respective state display controls.

Further, the display state of the projection display window includes off, on or selected.

Further, the projection display interface is provided with a projection display window, the display state adjustment area is provided with a projection content switching area, and the display state adjustment operation includes a projection content switching operation, and where the adjusting a display state of the projection display interface based on the display state adjustment operation includes:
  switching projection content displayed in the projection display window based on the projection content adjustment operation; or
  adjusting one or more projection display windows based on the projection content adjustment operation, to display projection content sent by a same projection transmitter.

Further, the projection display interface is provided with a projection display window, and the method further includes:
  updating, when it is detected that the number of the projection transmitter changes, the number of the projection display window to match the changed number of the projection transmitter.

Further, the projection display interface is provided with a projection display window, and the method further includes:
  determining a type of projection content sent by each projection transmitter, and adjusting a display mode of a projection display window corresponding to the projection transmitter based on the type of projection content.

Further, the display state adjustment area is provided with a display mode adjustment area, the display state adjustment operation includes a display mode adjustment operation, and where the adjusting a display state of the projection display interface based on the display state adjustment operation includes:
  adjusting a display mode of the display interface based on the display mode adjustment operation.

Further, the projection display interface is provided with one or more projection display windows, and the method further comprises:
  detecting projection display content displayed in the one or more projection display windows; and
  adjusting display modes of the one or more projection display windows based on the projection content displayed in respective projection display windows.

Further, the projection display interface is provided with one or more projection display windows, and each of the one or more projection display windows is provided with one or more display parameter adjustment areas.

Further, the method further includes:
  adjusting a display mode of the projection display interface based on the projection content sent by the projection transmitter.

Further, the receiving projection content sent by a projection transmitter and displaying the received projection content on a projection display interface of a projection receiver includes:

detecting the number of projection transmitters, and receiving projection content sent by each of the projection transmitters;

creating projection display windows on the projection display interface of the projection receiver, where the number of the projection display windows matches the number of the projection transmitters; and displaying projection content sent by the projection transmitters in the respective projection display windows.

An apparatus for screen mirroring is provided according to one or more embodiments of the present disclosure. The apparatus includes:

a projection content receiving module configured to receive projection content sent by a projection transmitter and display the received projection content on a projection display interface of a projection receiver, where the projection display interface is provided with a display state adjustment area;

an operation receiving module configured to receive a display state adjustment operation performed by a user based on the display state adjustment area; and a state adjustment module configured to adjust a display state of the projection display interface based on the display state adjustment operation.

Optionally, the display state adjustment area is provided with a resolution adjustment area. The display state adjustment operation includes a resolution adjustment operation. In order to adjust the display state of the projection display interface based on the display state adjustment operation, the state adjustment module is configured to:

adjust display resolution of the projection display interface based on the resolution adjustment operation.

Optionally, in order to adjust the display resolution of the projection display interface based on the resolution adjustment operation, the state adjustment module is configured to:

receive a resolution adjustment operation performed by the user based on the resolution adjustment area;

send a resolution adjustment request to the projection transmitter based on the resolution adjustment operation, where the resolution adjustment request includes target resolution; and receive projection content sent by the projection transmitter based on the resolution adjustment request. The resolution of the projection content is the target resolution.

Optionally, the projection display interface is provided with a transmitter display control. The apparatus is configured to:

detect a transmitter that is sending the projection content being displayed on the projection display interface; and display, on the transmitter display control, identification information of the transmitter that is sending the projection content being displayed.

Optionally, the projection display interface is provided with one or more projection display windows. Each projection display window is provided with a state display control. The apparatus is configured to:

monitor display states of the one or more projection display windows; and display the display states of the one or more projection display windows is respective on respective state display controls.

Optionally, the display state of the projection display window includes a first state, a second state or a third state. The first state indicates that the current window displays no projection content. The second state indicates that the current window is selected for displaying projection content. The third state indicates that the current window is displaying projection content.

Optionally, the projection display interface is provided with a projection display window. The display state adjustment area is provided with a projection content switching area. The display state adjustment operation includes a projection content switching operation. In order to adjust the display state of the projection display interface based on the display state adjustment operation, the state adjustment module is configured to:

switch projection content displayed in the projection display window based on the projection content adjustment operation; or adjust one or more projection display windows based on the projection content adjustment operation, to display projection content sent by the same projection transmitter.

Optionally, the projection display interface is provided with a projection display window, and the apparatus is further configured to:

update, when it is detected that the number of projection transmitters changes, the number of projection display windows to match the changed number of projection transmitters.

Optionally, the projection display interface is provided with a projection display window. The apparatus is further configured to:

determine a type of projection content sent by each projection transmitter, and adjust a display mode of a projection display window corresponding to the projection transmitter based on the type of projection content.

Optionally, the display state adjustment area is provided with a display mode adjustment area. The display state adjustment operation includes a display mode adjustment operation. In order to adjust the display state of the projection display interface based on the display state adjustment operation, the state adjustment module is configured to:

adjust a display mode of the display interface based on the display mode adjustment operation.

Optionally, the projection display interface is provided with one or more projection display windows. The apparatus is further configured to:

detect projection display content displayed in the one or more projection display windows; and adjust display modes of the one or more projection display windows based on the projection content displayed in respective projection display windows.

Optionally, the projection display interface is provided with one or more projection display windows. Each projection display window is provided with one or more display parameter adjustment areas.

Optionally, the apparatus is further configured to:

adjust the display mode of the projection display interface based on the projection content sent by the projection transmitter.

Optionally, in order to receive the projection content sent by the projection transmitter and display the projection content on the projection display interface of the projection receiver, the apparatus is further configured to:

detect the number of projection transmitters, and receive projection content sent by each of the projection transmitters;

create, on the projection display interface of the projection receiver, projection display windows with the same number of the projection transmitters; and display the projection content sent by the projection transmitters in respective projection display windows.

A method for screen mirroring is provided according to one or more embodiments of the present disclosure. The method includes:

receiving a multi-window display instruction, and displaying, in at least two target windows, projection information mirrored form a target projection source to a projection device, where the target window is one of at least two windows that are already opened on the projection device, and the target projection source is one of at least one projection source connected to the projection device.

In the embodiments of the present disclosure, the method further includes: acquiring a connection instruction and a window opening instruction, where the connection instruction is for instructing the projection device to connect to a projection source, and the window opening instruction is for instructing to open a window on the projection device.

In the embodiments of the present disclosure, the displaying, in at least two target windows, projection information mirrored form a target projection source to a projection device includes:

displaying, in the at least two target windows, the projection information mirrored by the target projection source to the projection device in a case that a first number is greater than a second number, where the first number is the number of windows opened on the instruction of the window opening instruction, and the second number is the number of projection sources connected to the projection device on the instruction of the connection instruction.

In the embodiments of the present disclosure, the first number is the number of all windows on the projection device, and the second number is one.

In the embodiments of the present disclosure, the method further includes:

acquiring a disconnection instruction; and closing all windows on the projection device in a case that the disconnection instruction instructs the projection device to be disconnected from the target projection source and the target projection source is the only one projection source connected to the projection device.

A method for screen mirroring is provided according to one or more embodiments of the present disclosure. The method includes:

receiving a display switching instruction; and alternatively displaying, in a target window, projection information mirrored by one of at least two target projection sources to a projection device and projection information mirrored by another of the at least two target projection sources to the projection device, where the target window is one of at least one window that is already opened on the projection device, and the target projection source is one of at least two projection sources connected to the projection device.

In the embodiments of the present disclosure, the alternatively displaying, in a target window, projection information mirrored by one of at least two target projection sources to a projection device and projection information mirrored by another of the at least two target projection sources to the projection device includes:

synchronously or asynchronously switching, in a case of at least two different target windows, projection information mirrored by the at least two target projection sources to the projection device in the at least two different target windows.

In the embodiments of the present disclosure, the method further includes:

receiving a window closing instruction;

remaining, in a case that the window closing instruction instructs to close at least one opened window rather than all opened windows, a connection between the projection device and each connected projection source unchanged; and disconnecting the projection device from all connected projection sources in a case that the window closing instruction instructs to close all opened windows, where the opened window is a window that has been opened in response to the window opening instruction, and the connected projection source is a projection source that has been connected to the projection device in response to the connection instruction.

An apparatus for screen mirroring is provided according to one or more embodiments of the present disclosure. The apparatus includes:

a first processing module configured to receive a multi-window display instruction, and display, in at least two target windows, projection information mirrored form a target projection source to a projection device, where the target window is one of at least two windows that are already opened on the projection device, and the target projection source is one of at least one projection source connected to the projection device.

In the embodiments of the present disclosure, the first processing module is further configured to acquire a connection instruction and a window opening instruction. The connection instruction instructs the projection device to connect to a projection source. The window opening instruction instructs to open a window on the projection device.

In the embodiments of the present disclosure, the first processing module is configured to display, in the at least two target windows, the projection information mirrored by the target projection source to the projection device in a case that a first number is greater than a second number. The first number is the number of windows opened on the instruction of the window opening instruction. The second number is the number of projection sources connected to the projection device on the instruction of the connection instruction.

In the embodiments of the present disclosure, the first number is the number of all windows on the projection device, and the second number is 1.

In the embodiment of the present disclosure, the first processing module is further configured to acquire a disconnection instruction. The first processing module is further configured to close all windows on the projection device in a case that the disconnection instruction instructs the projection device to be disconnected from the target projection source and the target projection source is the only one projection source connected to the projection device.

An apparatus for screen mirroring is provided according to one or more embodiments of the present disclosure. The apparatus includes:

a second processing module configured to receive a display switching instruction; and alternatively display, in a target window, projection information mirrored by one of at least two target projection sources to a projection device and projection information mirrored by another of the at least two target projection sources to the projection device, where the target window is one of at least one window that is already opened on the projection device, and the target projection source is one of at least two projection sources connected to the projection device.

The second processing module is configured to acquire a connection instruction and a window opening instruction. The connection instruction instructs the projection device to connect to the projection source. The window opening instruction instructs to open a window on the projection device.

In the embodiments of the present disclosure, the second processing module is configured to synchronously or asynchronously switch, in a case of at least two different target windows, projection information mirrored by the at least two target projection sources to the projection device in the at least two different target windows.

In the embodiments of the present disclosure, the second processing module is further configured to receive a window closing instruction. The second processing module is further configured to remain, in a case that the window closing instruction instructs to close at least one opened window rather than all opened windows, the connection between the projection device and each connected projection source unchanged. The second processing module is further configured to disconnect the projection device from all connected projection sources in a case that the window closing instruction instructs to close all opened windows. The opened window is a window that has been opened in response to the window opening instruction. The connected projection source is a projection source that has been connected to the projection device in response to the connection instruction.

The above description merely shows preferred embodiments according to the present disclosure and an illustration of the technical principles employed. Those skilled in the art should understand that the scope of disclosure involved in the present disclosure should cover other technical solutions formed by any combination of the above technical features or their equivalents without departing from the above disclosed concept, for example, a technical solution formed by replacing the above features with technical features (but not limited to) having functions similar to that disclosed in the present disclosure, rather than being limited to the technical solutions formed by the specific combination of the above technical features.

Additionally, although operations are illustrated in a particular order, the operations should not be construed as being performed in the particular order shown or in a sequential order necessarily. Under certain circumstances, multitasking and parallel processing may be advantageous. Likewise, the several implementation-specific details discussed above should not be construed as limitations on the scope of the present disclosure. Some features that are described in the context of separate embodiments may also be implemented in combination in a single embodiment. Alternatively, various features that are described in the context of a single embodiment may also be implemented in multiple embodiments separately or in any suitable sub-combination.

Although the subject matter has been described in languages specific to structural features and/or logical acts of method, it should understand that the subject matter defined in the appended claims is unnecessarily limited to the specific features or acts described above. Instead, the features and acts described above are merely example forms of implementing the claims.

What is claimed is:

1. A method for screen mirroring, comprising:
   acquiring a disconnection instruction;
   in response to the disconnection instruction, disconnecting at least one first target projection source from a projection device, and determining a second connection number, wherein the second connection number is the number of first target projection sources that are still connected to the projection device; and
   displaying, based on the second connection number and a first window number, projection information mirrored to the projection device from the first target projection sources that are still connected to the projection device, wherein the first window number is the number of target windows that are already opened on the projection device.

2. The method according to claim 1, wherein the displaying, based on the second connection number and a first window number, projection information mirrored to the projection device from the first target projection sources that are still connected to the projection device comprises:
   in a case that the second connection number is less than the first window number, closing target windows of a second window number, wherein the second window number is less than the first window number; and displaying, in target windows that are not closed, the projection information mirrored to the projection device from the first target projection sources that are still connected to the projection device; or
   in a case that the second connection number is greater than or equal to the first window number, remaining the first window number of the target windows open, and displaying, in the first window number of the target windows, the projection information mirrored to the projection device from the first target projection sources that are still connected to the projection device.

3. The method according to claim 2, wherein the displaying, in the first window number of the target windows, the projection information mirrored to the projection device from the first target projection sources that are still connected to the projection device comprises:
   displaying, in the first window number of target windows, the projection information mirrored to the projection device by a third connection number of first target projection sources that are still connected to the projection device, wherein the third connection number is less than or equal to the first window number, and the third connection number of the first target projection sources are determined based on a time sequence of connections between the first target projection sources and the projection device.

4. The method according to claim 3, wherein the displaying, in the first window number of target windows, the projection information mirrored to the projection device by a third connection number of first target projection sources that are still connected to the projection device comprises:
   displaying, in the first window number of the target windows, projection information mirrored to the projection device by different first target projection sources or the same first target projection source among the third connection number of the first target projection sources.

5. The method according to claim 2, wherein the disconnecting at least one first target projection source from a projection device comprises:
   disconnecting one first target projection source from the projection device, wherein before the first target projection source is disconnected from the projection device, projection information mirrored by the first target projection source to the projection device is displayed in a first connection number of target windows, and the first connection number is the number of first target projection sources connected to the projection device before the first target projection source is disconnected from the projection device, and wherein the displaying projection information mirrored to the projection device from the first target projection sources that are still connected to the projection device comprises:

alternatively displaying projection information mirrored to the projection device from the first target projection sources that are still connected to the projection device.

6. The method according to claim 5, further comprising:
closing at least one target window that was opened last after disconnecting the first target projection source from the projection device.

7. The method according to claim 1, further comprising:
disconnecting all first target projection sources connected to the projection device from the projection device when it is detected that all target windows are off.

8. The method according to claim 1, wherein
the first connection number is greater than or equal to 2, the first window number is greater than or equal to 1, and the first connection number is the number of first target projection sources connected to the projection device before the disconnecting at least one first target projection source from a projection device.

9. A method for screen mirroring, comprising:
acquiring a first connection instruction and a window opening instruction, wherein the first connection instruction is for instructing to connect a projection device to a projection source, and the window opening instruction is for instructing to open a window on the projection device; and
receiving a window display instruction, and displaying, in target windows, projection information mirrored from first target projection sources to the projection device, wherein the target windows are comprised in windows indicated by the window display instruction among windows opened on the instruction of the window opening instruction, and the first target projection sources comprise a projection source connected to the projection device on the instruction of the first connection instruction.

10. The method according to claim 9, further comprising:
determining a first connection number and a first window number, wherein the first connection number is the number of the first target projection sources connected to the projection device, and the first window number is the number of target windows that are already opened on the projection device;
acquiring a second connection instruction, wherein the second connection instruction is for instructing the projection device to connect to a second target projection source; and
displaying, based on the first connection number and the first window number, projection information mirrored by the second target projection source to the projection device, wherein the second target projection source is a projection source other than each of the first target projection sources.

11. The method according to claim 10, wherein the displaying, based on the first connection number and the first window number, projection information mirrored by the second target projection source to the projection device comprises:
displaying, in at least one of two target windows displaying projection information mirrored by a same first target projection source, the projection information mirrored by the second target projection source to the projection device, in a case that the first connection number is less than a first preset threshold and the first window number is equal to a second preset threshold; or
displaying, in response to a received disconnection instruction and in at least one of the target windows, the projection information mirrored by the second target projection source to the projection device, in a case that the first connection number is equal to a first preset threshold, wherein the disconnection instruction is for instructing to disconnect at least one of the first target projection sources from the projection device, the first preset threshold represents a maximum number of projection sources to be connected to the projection device, and the second preset threshold represents a maximum number of windows to be opened on the projection device.

12. The method according to claim 11, wherein the displaying, in response to a received disconnection instruction and in at least one of the target windows, the projection information mirrored by the second target projection source to the projection device comprises:
determining, in response to the received disconnection instruction, the target window as a display window for the second target projection source that is newly connected to the projection device, and displaying the projection information mirrored by the second target projection source to the projection device in the display window, wherein the disconnection instruction is for instructing to disconnect the first target projection source from the projection device, and projection information mirrored by the first target projection source to the projection device is displayed in the display window.

13. The method according to claim 11, wherein the displaying, in response to a received disconnection instruction and in at least one of the target windows, the projection information mirrored by the second target projection source to the projection device comprises:
determining, in response to the received disconnection instruction, the at least one target window based on at least one of: a target window having a focus among the target windows, a prompt of each of the target windows, and a preset selection box; and
displaying the projection information mirrored by the second target projection source to the projection device in the at least one target window.

14. A method for screen mirroring, comprising:
receiving a display switching instruction; and alternatively displaying, in a target window, projection information mirrored by one of at least two target projection sources to a projection device and projection information mirrored by another of the at least two target projection sources to the projection device, wherein the target window is one of at least one window that is already opened on the projection device, and the target projection source is one of at least two projection sources connected to the projection device.

15. The method according to claim 14, further comprising:
acquiring a connection instruction and a window opening instruction, wherein the connection instruction is for instructing a projection device to connect to a projection source, and the window opening instruction is for instructing to open a window on the projection device.

16. The method according to claim 14, wherein the alternatively displaying, in a target window, projection information mirrored by one of at least two target projection sources to a projection device and projection information mirrored by another of the at least two target projection sources to the projection device comprises:
   synchronously or asynchronously switching, in a case of at least two different target windows, projection information mirrored by the at least two target projection sources to the projection device in the at least two different target windows.

17. The method according to claim 15, further comprising:
   receiving a window closing instruction;
   remaining, in a case that the window closing instruction instructs to close at least one opened window rather than all opened windows, a connection between the projection device and each connected projection source unchanged; and
   disconnecting the projection device from all connected projection sources in a case that the window closing instruction instructs to close all opened windows, wherein the opened window is a window that has been opened in response to the window opening instruction, and the connected projection source is a projection source that has been connected to the projection device in response to the connection instruction.

* * * * *